(12) United States Patent
Jones et al.

(10) Patent No.: US 10,681,151 B2
(45) Date of Patent: Jun. 9, 2020

(54) NOTIFICATION FRAMEWORK FOR WIRELESS NETWORKS

(75) Inventors: David Jones, Seattle, WA (US); Thomas W. Kuehnel, Seattle, WA (US); Deyun Wu, Kirkland, WA (US); Amer A. Hassan, Kirkland, WA (US); Andrew T. Baron, Redmond, WA (US); Yi Lu, Sammamish, WA (US); Hui Shen, Sammamish, WA (US); John W. Archer, Marysville, WA (US); Sundar P. Subramani, Bellevue, WA (US); Vinod K. Swamy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 983 days.

(21) Appl. No.: 13/250,655

(22) Filed: Sep. 30, 2011

(65) Prior Publication Data
US 2012/0022948 A1    Jan. 26, 2012

Related U.S. Application Data

(63) Continuation-in-part of application No. 11/434,393, filed on May 15, 2006, now abandoned, and a
(Continued)

(51) Int. Cl.
*G06Q 40/00* (2012.01)
*H04L 29/08* (2006.01)
(Continued)

(52) U.S. Cl.
CPC ......... *H04L 67/16* (2013.01); *G06Q 30/0267* (2013.01); *H04L 67/36* (2013.01);
(Continued)

(58) Field of Classification Search
CPC . G06Q 30/02; G06Q 30/0261; G06Q 30/0267
(Continued)

(56) References Cited

U.S. PATENT DOCUMENTS

| | | |
|---|---|---|
| 5,724,588 A | 3/1998 | Atkinson et al. |
| 5,850,444 A | 12/1998 | Rune |

(Continued)

FOREIGN PATENT DOCUMENTS

| | | |
|---|---|---|
| CN | 1389055 | 1/2003 |
| CN | 1537298 A | 10/2004 |

(Continued)

OTHER PUBLICATIONS

Chandra, Ranveer, Jitendra Padhye, Lenin Ravindranath, and Alec Wolman. Beacon Stuffing: Wi-Fi Without Associations. Rep. IEEE Communications Society, Feb. 2007. Microsoft Research. Web. Feb. 22, 2011. <http://research.microsoft.com/apps/pubs/default.aspx?id=73482>.*

(Continued)

*Primary Examiner* — Jessica Lemieux

(57) ABSTRACT

Discovery of services between devices is provided prior to establishing a connection between devices, including wireless-enabled devices or devices that are communicatively coupled to wireless access points or other wireless communication devices. Discovering services prior to establishing a connection may facilitate finding a desired service. The services that may be discovered may be, for example, print services, camera services, PDA services or any other suitable services. Services may be discovered using 802.11, Bluetooth, UWB or any other suitable wireless technology. A graphical user interface is provided that enables a user to select a desired service.

20 Claims, 12 Drawing Sheets

Related U.S. Application Data continuation-in-part of application No. 11/973,589, filed on Oct. 9, 2007, now abandoned.

(51) Int. Cl.
 *G06Q 30/02* (2012.01)
 *H04W 48/16* (2009.01)
 *H04W 4/00* (2018.01)
 *H04W 4/50* (2018.01)

(52) U.S. Cl.
 CPC .............. *H04W 4/00* (2013.01); *H04W 4/50* (2018.02); *H04W 48/16* (2013.01)

(58) Field of Classification Search
 USPC .......................................................... 705/14
 See application file for complete search history.

(56) References Cited

U.S. PATENT DOCUMENTS

| | | | |
|---|---|---|---|
| 6,002,941 | A | 12/1999 | Ablay et al. |
| 6,282,183 | B1 | 8/2001 | Harris et al. |
| 6,353,398 | B1* | 3/2002 | Amin et al. ............. 340/995.12 |
| 6,452,498 | B2* | 9/2002 | Stewart ...................... 340/573.1 |
| 6,522,881 | B1 | 2/2003 | Feder et al. |
| 6,532,368 | B1 | 3/2003 | Hild et al. |
| 6,633,757 | B1 | 10/2003 | Herman et al. |
| 6,659,947 | B1 | 12/2003 | Carter et al. |
| 6,728,232 | B2 | 4/2004 | Hasty, Jr. et al. |
| 6,763,014 | B2 | 7/2004 | Kennedy |
| 6,842,460 | B1 | 1/2005 | Olkkonen et al. |
| 6,862,737 | B1 | 3/2005 | Iwamura et al. |
| 6,892,052 | B2 | 5/2005 | Kotola et al. |
| 6,909,706 | B2 | 6/2005 | Wilmer et al. |
| 6,909,721 | B2 | 6/2005 | Ekberg et al. |
| 6,952,715 | B1 | 10/2005 | Kronz |
| 6,957,086 | B2 | 10/2005 | Bahl et al. |
| 6,961,560 | B2 | 11/2005 | Hermann et al. |
| 6,966,714 | B2 | 11/2005 | Harris et al. |
| 6,993,326 | B2* | 1/2006 | Link et al. .................. 455/414.1 |
| 7,024,552 | B1 | 4/2006 | Caswell et al. |
| 7,046,647 | B2 | 5/2006 | Oba et al. |
| 7,054,627 | B1 | 5/2006 | Hillman |
| 7,120,420 | B2 | 10/2006 | Karaoguz et al. |
| 7,130,289 | B2 | 10/2006 | Kuan et al. |
| 7,155,167 | B1 | 12/2006 | Carty |
| 7,181,530 | B1 | 2/2007 | Halasz et al. |
| 7,233,991 | B2 | 6/2007 | Adhikari |
| 7,243,233 | B2 | 7/2007 | Kindberg et al. |
| 7,269,260 | B2 | 9/2007 | Adachi et al. |
| 7,272,407 | B2 | 9/2007 | Strittmatter et al. |
| 7,313,111 | B2 | 12/2007 | Hietalahti et al. |
| 7,359,363 | B2 | 4/2008 | Sakai |
| 7,359,989 | B2 | 4/2008 | Orava et al. |
| 7,366,511 | B2 | 4/2008 | Jaakkola et al. |
| 7,370,362 | B2 | 5/2008 | Olson et al. |
| 7,403,512 | B2 | 7/2008 | Tsai et al. |
| 7,412,518 | B1 | 8/2008 | Duigou et al. |
| 7,421,582 | B2 | 9/2008 | Fu et al. |
| 7,477,746 | B2 | 1/2009 | Kang et al. |
| 7,505,443 | B2 | 3/2009 | McNew et al. |
| 7,505,595 | B2 | 3/2009 | Lee et al. |
| 7,558,960 | B2 | 7/2009 | Cam et al. |
| 7,613,426 | B2 | 11/2009 | Kuehnel et al. |
| 7,617,317 | B2 | 11/2009 | Jones et al. |
| 7,636,338 | B1 | 12/2009 | Vu et al. |
| 7,680,494 | B2 | 3/2010 | Karaoguz et al. |
| 7,853,788 | B2 | 12/2010 | Fascenda |
| 7,861,283 | B2 | 12/2010 | Kobayashi |
| 7,876,735 | B2 | 1/2011 | Krantz et al. |
| 7,903,646 | B2 | 3/2011 | Ikeda |
| 8,116,287 | B2 | 2/2012 | Krantz et al. |
| 8,126,145 | B1 | 2/2012 | Tewari et al. |
| 8,281,010 | B2 | 10/2012 | Ansari et al. |
| 8,478,300 | B2 | 7/2013 | Kuehnel et al. |
| 8,559,350 | B2 | 10/2013 | Kuehnel et al. |
| 9,109,903 | B2 | 8/2015 | Wu et al. |
| 2001/0010689 | A1 | 8/2001 | Atwater et al. |
| 2001/0041568 | A1 | 11/2001 | Hughes et al. |
| 2002/0032746 | A1 | 3/2002 | Lazaridis |
| 2002/0083121 | A1 | 6/2002 | Chang et al. |
| 2002/0120750 | A1 | 8/2002 | Nidd |
| 2002/0138564 | A1 | 9/2002 | Treptow et al. |
| 2002/0160817 | A1 | 10/2002 | Salmimaa et al. |
| 2002/0176579 | A1 | 11/2002 | Deshpande et al. |
| 2003/0009758 | A1 | 1/2003 | Townsend et al. |
| 2003/0045280 | A1 | 3/2003 | Simons |
| 2003/0065851 | A1 | 4/2003 | Layman |
| 2003/0097592 | A1 | 5/2003 | Adusumilli |
| 2003/0100315 | A1 | 5/2003 | Rankin |
| 2003/0158922 | A1 | 8/2003 | Park |
| 2003/0196115 | A1 | 10/2003 | Karp |
| 2003/0208595 | A1 | 11/2003 | Gouge et al. |
| 2003/0217289 | A1 | 11/2003 | Ammon et al. |
| 2003/0223424 | A1 | 12/2003 | Anderson et al. |
| 2003/0228842 | A1 | 12/2003 | Heinonen et al. |
| 2004/0006705 | A1 | 1/2004 | Walker |
| 2004/0009769 | A1 | 1/2004 | Yokoyama |
| 2004/0023640 | A1 | 2/2004 | Ballai |
| 2004/0053613 | A1 | 3/2004 | Karaoguz et al. |
| 2004/0066756 | A1 | 4/2004 | Ahmavaara et al. |
| 2004/0068653 | A1 | 4/2004 | Fascenda |
| 2004/0076279 | A1* | 4/2004 | Taschereau .............. 379/218.01 |
| 2004/0077336 | A1 | 4/2004 | Lauriol |
| 2004/0087274 | A1 | 5/2004 | Ekberg et al. |
| 2004/0088934 | A1 | 5/2004 | Kain |
| 2004/0102215 | A1 | 5/2004 | Karr et al. |
| 2004/0106408 | A1 | 6/2004 | Beasley et al. |
| 2004/0152416 | A1 | 8/2004 | Dahl |
| 2004/0170134 | A1 | 9/2004 | Furuyama et al. |
| 2004/0176117 | A1 | 9/2004 | Strittmatter et al. |
| 2004/0203890 | A1 | 10/2004 | Karaoguz et al. |
| 2004/0208151 | A1 | 10/2004 | Haverinen et al. |
| 2004/0213409 | A1 | 10/2004 | Murto et al. |
| 2004/0246983 | A1 | 12/2004 | Kaatz |
| 2004/0253948 | A1 | 12/2004 | Laberteaux |
| 2005/0005095 | A1 | 1/2005 | Meandzija et al. |
| 2005/0021725 | A1 | 1/2005 | Lobbert |
| 2005/0032556 | A1 | 2/2005 | Bennett et al. |
| 2005/0041634 | A1 | 2/2005 | Aura |
| 2005/0058109 | A1 | 3/2005 | Ekberg |
| 2005/0078644 | A1 | 4/2005 | Tsai et al. |
| 2005/0083929 | A1 | 4/2005 | Salo et al. |
| 2005/0096047 | A1 | 5/2005 | Haberman et al. |
| 2005/0099985 | A1 | 5/2005 | Callaway et al. |
| 2005/0128958 | A1 | 6/2005 | Hamdan |
| 2005/0141498 | A1 | 6/2005 | Cam winget et al. |
| 2005/0147073 | A1 | 7/2005 | Hietalahti et al. |
| 2005/0164678 | A1 | 7/2005 | Rezvani et al. |
| 2005/0176420 | A1 | 8/2005 | Graves et al. |
| 2005/0185660 | A1 | 8/2005 | Ekberg et al. |
| 2005/0186949 | A1 | 8/2005 | Ho |
| 2005/0193106 | A1 | 9/2005 | Desai et al. |
| 2005/0197136 | A1 | 9/2005 | Friday et al. |
| 2005/0232242 | A1 | 10/2005 | Karaoguz et al. |
| 2005/0255839 | A1 | 11/2005 | Pertila |
| 2005/0255844 | A1 | 11/2005 | Sugaya et al. |
| 2005/0260972 | A1 | 11/2005 | Karaoguz et al. |
| 2005/0282556 | A1 | 12/2005 | Morrie |
| 2005/0286456 | A1 | 12/2005 | Mcnew et al. |
| 2006/0004456 | A1 | 1/2006 | McKay |
| 2006/0094456 | A1 | 1/2006 | McKay |
| 2006/0030265 | A1 | 2/2006 | Desai et al. |
| 2006/0034256 | A1 | 2/2006 | Addagatla et al. |
| 2006/0036517 | A1 | 2/2006 | Walter |
| 2006/0039337 | A1 | 2/2006 | Hodoshima |
| 2006/0047835 | A1 | 3/2006 | Greaux |
| 2006/0078123 | A1 | 4/2006 | Bichot et al. |
| 2006/0089138 | A1 | 4/2006 | Smith et al. |
| 2006/0126579 | A1 | 6/2006 | Kim et al. |
| 2006/0133414 | A1 | 6/2006 | Luoma et al. |
| 2006/0143458 | A1 | 6/2006 | Tie et al. |
| 2006/0153151 | A1 | 7/2006 | Huang et al. |
| 2006/0171540 | A1 | 8/2006 | Lee et al. |

(56) References Cited

U.S. PATENT DOCUMENTS

| | | |
|---|---|---|
| 2006/0187889 A1 | 8/2006 | Mehta et al. |
| 2006/0189298 A1 | 8/2006 | Marcelli |
| 2006/0209773 A1 | 9/2006 | Hundal et al. |
| 2006/0217131 A1 | 9/2006 | Alizadeh-Shabdiz et al. |
| 2006/0223527 A1 | 10/2006 | Lee et al. |
| 2006/0227972 A1 | 10/2006 | Brok et al. |
| 2006/0253559 A1 | 11/2006 | Espina Perez et al. |
| 2006/0262932 A1 | 11/2006 | Sood et al. |
| 2006/0268896 A1 | 11/2006 | Kotola et al. |
| 2006/0274695 A1 | 12/2006 | Krishnamurthi et al. |
| 2006/0282514 A1 | 12/2006 | Saint-Hilaire et al. |
| 2007/0006098 A1 | 1/2007 | Krumm et al. |
| 2007/0025371 A1 | 2/2007 | Krantz |
| 2007/0026856 A1 | 2/2007 | Krantz et al. |
| 2007/0032219 A1 | 2/2007 | Rudolf et al. |
| 2007/0036119 A1 | 2/2007 | Haddad et al. |
| 2007/0097904 A1 | 5/2007 | Mukherjee et al. |
| 2007/0117548 A1 | 5/2007 | Fernandez-Alonso et al. |
| 2007/0118587 A1 | 5/2007 | Ishikawa et al. |
| 2007/0123260 A1 | 5/2007 | Kim et al. |
| 2007/0140214 A1 | 6/2007 | Zoltan |
| 2007/0141984 A1 | 6/2007 | Kuehnel |
| 2007/0141986 A1 | 6/2007 | Kuehnel |
| 2007/0141988 A1 | 6/2007 | Kuehnel et al. |
| 2007/0147313 A1 | 6/2007 | Braam et al. |
| 2007/0147324 A1 | 6/2007 | McGary |
| 2007/0150570 A1 | 6/2007 | Eastham et al. |
| 2007/0218875 A1 | 9/2007 | Calhoun et al. |
| 2007/0242643 A1 | 10/2007 | Chandra et al. |
| 2007/0242645 A1 | 10/2007 | Stephenson et al. |
| 2007/0264968 A1 | 11/2007 | Frank et al. |
| 2007/0264974 A1 | 11/2007 | Frank et al. |
| 2007/0264991 A1 | 11/2007 | Jones et al. |
| 2008/0261574 A1 | 10/2008 | Rinta-Aho et al. |
| 2008/0261591 A1 | 10/2008 | Laurnen et al. |
| 2008/0276303 A1 | 11/2008 | Gast |
| 2008/0285670 A1 | 11/2008 | Walton et al. |
| 2009/0031398 A1 | 1/2009 | Zheng et al. |
| 2009/0094111 A1 | 4/2009 | Wu |
| 2009/0144201 A1 | 6/2009 | Gierkink et al. |
| 2009/0214036 A1 | 8/2009 | Shen et al. |
| 2010/0027441 A1 | 2/2010 | Curtis et al. |
| 2012/0022948 A1 | 1/2012 | Jones et al. |
| 2015/0327067 A1 | 11/2015 | Shen et al. |
| 2017/0142586 A1 | 5/2017 | Shen et al. |

FOREIGN PATENT DOCUMENTS

| | | |
|---|---|---|
| CN | 1585336 | 2/2005 |
| CN | 1631010 | 6/2005 |
| CN | 1757195 | 4/2006 |
| EP | 1215864 A2 | 6/2002 |
| EP | 1 227 689 A1 | 7/2002 |
| EP | 1220552 A1 | 7/2002 |
| EP | 1253539 A2 | 10/2002 |
| EP | 1 298 847 A1 | 4/2003 |
| EP | 1370050 | 10/2003 |
| EP | 1494394 | 1/2005 |
| EP | 1509003 A2 | 2/2005 |
| EP | 1609325 A1 | 12/2005 |
| EP | 1 727 310 A1 | 11/2006 |
| EP | 1 760 654 A1 | 3/2007 |
| JP | 2000305885 A | 11/2000 |
| JP | 2001/298467 | 10/2001 |
| JP | 2002-502568 | 1/2002 |
| JP | 2003087265 A | 3/2003 |
| JP | 2003091679 A | 3/2003 |
| JP | 2003258808 | 9/2003 |
| JP | 2003333636 A | 11/2003 |
| JP | 2004104774 A | 4/2004 |
| JP | 2004179872 | 6/2004 |
| JP | 2004235976 | 8/2004 |
| JP | 2004-254311 | 9/2004 |
| JP | 2004248072 | 9/2004 |
| JP | 2005050793 A | 2/2005 |
| JP | 2005328231 | 11/2005 |
| JP | 2007036790 A | 2/2007 |
| JP | 2007068164 A | 3/2007 |
| JP | 2007088737 A | 4/2007 |
| JP | 2007509565 A | 4/2007 |
| JP | 2008042862 A | 2/2008 |
| KR | 1999023310 | 3/1999 |
| KR | 20000017730 A | 4/2000 |
| KR | 20060002649 A | 1/2006 |
| RU | 2005129108 | 1/2006 |
| RU | 2349056 C2 | 3/2009 |
| WO | 98/54870 | 12/1998 |
| WO | 01/086486 | 11/2001 |
| WO | 0201812 A2 | 1/2002 |
| WO | 03/081373 | 10/2003 |
| WO | 04/04918 | 1/2004 |
| WO | 2004089016 A1 | 10/2004 |
| WO | WO 2004086667 A2 | 10/2004 |
| WO | 2005039146 A2 | 4/2005 |
| WO | 2005069582 A1 | 7/2005 |
| WO | WO 2005/060416 A3 | 7/2005 |
| WO | 2006/096389 | 9/2006 |
| WO | WO 2007/019689 A1 | 2/2007 |
| WO | 2007080490 A1 | 7/2007 |

OTHER PUBLICATIONS

Supplementary European Search Report for related EP application No. 08837680.1-1238, mailed Jun. 13, 2012.

802.11 Beacons Revealed http://wi-figurus.com/index2.php?option=com_content&do_pdf=1&id=47, 2 pages, Mar. 19, 2007.

Chandra et al., "Beacon-Stuffing: Wi-Fi Without Associations," IEEE Communications Society, Feb. 2007. Available at http://research.microsoft.com/users/alecw/hotmobile-2007.pdf.

Cisco Systems, The Benefits of Centralization in Wireless LANs via the Cisco Unified Wireless Network, White Paper, Feb. 2006, 13 pages., http://www.cisco.com/application/pdf/en/us/guest/products/ps6521/c1650/cdccont_0900aecd8040f7b2.pdf.

Davies et al, "Using and Determining Location in a Context-Sensitive Tour Guide," Computer, vol. 34, Issue 8, Aug. 2001, pp. 35-41.

DiSorte et al., "Beacon-Based Service Publishing Framework in Multiservice Wi-Fi Hotspots," *EURASIP Journal on Wireless Communications and Networking*, vol. 2007, Article ID 38463, Hindawai Publishing Corporation, 18 pages, 2004. http://hindawi.com/GetPDF.aspx?doi-10.1155/2007/38463.

Friday et al., "Supporting Service Discovery, Querying and Interaction in Ubiquitous Computing Environments," Wireless Networks, 2004, pp. 631-641, vol. 10, Kluwer Academic Publishers, The Netherlands. http://delivery.acm.org/10.1145/1040000/1035680/p31-friday.pdf?key1=1035680&key2=6630472311&coll=GUIDE&dl=GUIDE&CFID=58960884&CFTOKEN=5973545.

Hämäläinen, "Business Models Based on Facilities Bundling: Success Criteria," Helsinki University of Technology, Networking Laboratory, pp. 1-6, 2006. http://www.netlab.tkk.fi/opetus/s383042/2006/papers_pdf/D1.pdf.

Helal et al, "Konark—A Service Discovery and Delivery Protocol for Ad-Hoc Networks," 2003, pp. 1-7, University of Florida, Gainesville, Florida. http://media.csee.ltu.se/reading/papers/konark_wcnc2003.pdf.

Hodes et al., "Composable ad hoc location-based services for heterogeneous mobile clients," Wireless Networks, No. 5, 1999.

International Search Report from International Application No. PCT/US2008/077388 mailed Feb. 17, 2009.

International Search Report from International Application No. PCT/US2008/077442 mailed Mar. 31, 2009.

International Search Report and Written Opinion from International Application No. PCT/US2007/007745 mailed Sep. 12, 2007.

International Search Report and Written Opinion for International application No. PCT/US2007/011636, mailed Dec. 20, 2007.

International Search Report and Written Opinion for International application No. PCT/US2007/011654, mailed Dec. 18, 2007.

International Search Report and Written Opinion from International Application No. PCT/US2006/048924, mailed Jun. 19, 2007.

(56) References Cited

OTHER PUBLICATIONS

International Search Report and Written Opinion from International Application No. PCT/US2009/031451 mailed Jun. 29, 2009.
Jamaluddin et al., Hotring Advertising Model for Broadband Hotspots, *IEEE Communications Society*, WCNC 2004, pp. 2064-2068, 2004. http://ieeexplore.ieee.org/iel5/9178/29117/01311403.pdf?isNumber.
Jones et al., "What Where Wi: An Analysis of Millions of WI-Fi Access Points," Division of Computer Science and Systems, Georgia Institute of Technology, Atlanta, GA, 8 pages, 2007. http://www.cc.gatech.edu/cercs/tech-reports/tr2006/git-cercs-06-10.pdf.
Klein et al., "Service Rings—A Semantic Overlay for Service Discovery in Ad hoc Networks," Institute for Program Structures and Data Organisation, Universität Kalsruhe, Karlsruhn, Germany, 7 pages, 2003. http://citeseer.ist.psu.edu/cache/papers/cs/27184/http:zSzzSzwww.ipd.uka.dezSzDIANEzSzenzSzinhaltezSz..zSz..zSzdocszSzNBIS2003.pdf/klein03service.pdf.
Koskela et al., "Combining WLAN Indoor Positioning and Multimedia Messaging Services," Tampere University of Technology, Pori, Finland, 5 pages, 2003. http://www.iua.upf.es/activitats/semirec/semimustonen/articles/Article%20of%20Mikko%20Koskela.pdf.
Krumm et al., "The NearMe Wireless Proximity Server," UbiComp 2004, The Sixth International Conference on Ubiquitous Computing, pp. 283-300, Sep. 7-10, 2004, Nottingham, England. http://research.microsoft.com/users/kenh/papers/NearMe.pdf.
Lenders et al., "Service Discovery in Mobile Ad Hoc Networks: A Field Theoretic Approach," Swiss Federal Institute of Technology (ETH Zürich), Switzerland, 11 pages, 2005. http://www.tik.ee.ethz.ch/~lenders/publication/lenders_wowmom05.pdf *Partly founded by the Swiss National Science Foundation (SNF) under grant 200021-103578.
Meier, et al., "Proximity-Based Service Discovery in Mobile Ad Hoc Networks," Distributed Systems Group, Distributed Systems Group, Department of Computer Science, Trinity College, Dublin, Ireland, 15 pages, 2005. http://www.es.tcd.ie/publications/tech-reports/reports.05/TCD-CS-2005-35.pdf.
Melnikov, "Open Solutions for Location Based Services in WLAN Environment," Tampere University of Technology, Pori, Finland, Mar. 2004, 65 pages, http://trc.pori.tut.fi/tots/Diplomityo_Henry_Melnikov.pdf.
Munson et al., "Flexible Internetworking of Devices and Controls," Industrial Electronics Society, 1999, the $25^{th}$ Annual Conference of the IEEE San Jose, CA, USA, Nov. 29 to Dec. 3, 1999, pp. 1139-1145.
New Networking Features in Windows Server 2008 and Windows Vista http://technet.microsoft.com/en-gb/library/bb726965(d=printer).aspx, 30 pages, Apr. 25, 2007.
Pagurek et al., "Management of Advanced Services in H.323 Internet Protocol Telephony," Proceedings IEEE INFOCOM, The Conference on Computer Communications, Tel Aviv, Israel, Mar. 26, 2000.
Polk, et al., "Dynamic Host Configuration Protocol Option for Coordinate-based Location Configuration Information," Network Working Group, Standards Track, Jul. 2004, 13 pages, http://www.ietf.org/rfc/rfc3825.txt.
Poupyrev, et al., "Service Discovery in TinyObj: Strategies and Approaches," The Graduate School of Frontier Science, Tokyo University, Peter Davis, Adaptive Communications Research Laboratories, ATR, 4 pages, 2008. http://www.medien.ifi.lmu.de/permid2005/pdf/PavelPoupyrev_Permid2005.pdf.
Quigley et al., "BlueStar, a Privacy Centric Location Aware System," IEEE Position, Location and Navigation Symposium 2004, Monterey, USA Apr. 26-29, 2004. http://www.cs.ucd.ie/staff/aquigley/home/downloads/aq-plans2004.pdf.
Raverdy et al., "A Multi-Protocol Approach to Service Discovery and Access in Pervasive Environments," 7 pages, 2006. http://www-c.inria.fr/plastic/test-1/raverdy_mobiquitous.pdf.
Rekimoto et al., "Proximal Interactions: A Direct Manipulation Technique for Wireless Networking," 2003, pp. 1-8, Sony Computer Science Laboratories, Inc., Tokyo, Japan. http://www.idemployee.id.tue.nl/g.w.m.rauterberg/conferences/INTERACT2003/INTERACT2003-p511.pdf.
Samulowitz et al., "Adaptive Interaction for Enabling Pervasive Services," 2001, pp. 20-26, http://delivery.acm.org/10.1145/380000/376886/p20-samulowitz.pdf?key1=376886&key2=4070384811&coll=GUIDE&dl=GUIDE&CFID=28883839&CFTOKEN=55961476.
STMicroelectronics, "Dual-band IEEE 802.11a/b/g mobile Wi-Fi solution," Product Description, Feb. 2006, 2 pages, http://www.st.com/stonline/products/promlit/pdf/fldual0206.pdf.
Trevor et al., "The Use of Adapters to Support Cooperative Sharing," Proceedings of the Conference on Computer Supported Cooperative Work, pp. 219-230, Oct. 22, 1994.
Wojtiuk, "Bluetooth and WiFi integration: Solving co-existence challenges," Semiconductor Technology, Oct. 2004, pp. 20-26, http://rfdesign.com/mag/410rfdfl.pdf.
Wong, W.H., et al., "Wireless LAN Positioning with Mobile Devices in a Library Environment," Distributed Computing Systems Workshops, 2005, 25th IEEE International Conference, Jun. 6, 2005, pp. 633-636.
Partial Translation of "China Notice on the First Office Action", Application/Patent No. 200780017769.2, Mailed Date: Jan. 6, 2012, pp. 3.
"China Notice of the Second Office Action" Application/Patent No. 200780017769.2, Mailed Date: Aug. 15, 2012, pp. 5.
"China Notice on the First Office Action" and partial translation thereof, Application/Patent No. 200880111352.7, Mailed Date: Jun. 5, 2012, pp. 8.
"Japanese Office Action" Application/Patent No. 2009511029, Mailed Date: Sep. 30, 2011, pp. 3.
"Notice of Allowance and Fee(s) Due", U.S. Appl. No. 11/434,394, filed May 15, 2006, pp. 15.
"Non Final Office Action", Mailed Date: May 22, 2012, U.S. Appl. No. 11/434,394, filed May 15, 2006, pp. 28.
"Final Office Action", Mailed Date: Dec. 17, 2009, U.S. Appl. No. 11/434,394, filed May 15, 2006, pp. 12.
International Search Report from International Application No. PCT/US01/15099, published Nov. 21, 2002, 5 pages.
"Mexican Office Action", Mailed Date: Aug. 3, 2011, Application No. MX/a/2008/014540, pp. 2.
"Russian Office Action", Mailed Date: Apr. 15, 2011, Application No. 2008145037, pp. 4.
"Japan Office Action", Mailed Date: May 8, 2012, Application No. 2009-511039, pp. 3.
"Non Final Office Action", Mailed Date: Jun. 25, 2009, U.S. Appl. No. 11/434,394, pp. 18.
China Notice on the First Office Action and partial translation, Application/Patent No. 200780017769.2, Mailed Date: Jan. 6, 2012, pp. 6.
Delamer et al.; "A Peer-to-Peer Discovery Protocol for Semantic Web Services in Industrial Embedded Controllers"; Industrial Electronics Society; 2005; IECON 2005; 31st Annual Conference of IEEE; Nov. 6-10, 2005, 7 pages.
Office Action from TW Patent App. No. 096117089 dated May 8, 2013; 10 pages, including English summary/translation.
"Notice of Allowance and Fee(s) Due", U.S. Appl. No. 11/434,394, filed May 15, 2006, dated Mar. 11, 2013, pp. 8.
Extended European Search Report dated Mar. 15, 2013 in EP Pat. App. No. 07809085.9; 8 pages.
Advisory Action dated Jul. 22, 2009 in U.S. Appl. No. 11/434,393.
Amendment & Response to Final Office Action dated Apr. 24, 2009, filed in U.S. Appl. No. 11/313,148 dated Jul. 23, 2009.
Amendment & Response to Final Office Action dated Apr. 28, 2009, filed in U.S. Appl. No. 11/434,393 dated Jun. 29, 2009.
Amendment & Response to Final Office Action dated May 21, 2010, filed in U.S. Appl. No. 11/313,148 dated Aug. 23, 2010.
Amendment & Response to Final Office Action dated Oct. 24, 2008, filed in U.S. Appl. No. 11/312,040 dated Jan. 26, 2009.
Amendment & Response to Final Office Action dated Sep. 2, 2010, filed in U.S. Appl. No. 11/434,393 dated Nov. 15, 2010.
Amendment & Response to Non-Final Office Action dated Apr. 13, 2010, filed in U.S. Appl. No. 11/434,393 dated Jun. 25, 2010.

(56) References Cited

OTHER PUBLICATIONS

Amendment & Response to Non-Final Office Action dated Dec. 10, 2008, filed in U.S. Appl. No. 11/434,393 dated Mar. 10, 2009.
Amendment & Response to Non-Final Office Action dated Jan. 21, 2011, filed in U.S. Appl. No. 11/434,393 dated Apr. 15, 2011.
Amendment & Response to Non-Final Office Action dated Jun. 25, 2009, filed in U.S. Appl. No. 11/434,394 dated Sep. 25, 2009.
Amendment & Response to Non-Final Office Action dated Mar. 28, 2008, filed in U.S. Appl. No. 11/312,040 dated Jul. 28, 2008.
Amendment & Response to Non-Final Office Action dated Nov. 12, 2008, filed in U.S. Appl. No. 11/313,148 dated Feb. 12, 2009.
Amendment & Response to Non-Final Office Action dated Nov. 6, 2009, filed in U.S. Appl. No. 11/313,148 dated Feb. 8, 2010.
Amendment & Response to Non-Final Office Action dated Oct. 5, 2009, filed in U.S. Appl. No. 11/434,393 dated Jan. 5, 2010.
Amendment after Notice of Allowance dated May 7, 2009, filed in U.S. Appl. No. 11/312,040 dated Jul. 27, 2009.
Amendment and Response filed Apr. 30, 2012 in U.S. Appl. No. 11/313,148, 13 pgs.
Canada Application No. 2651236, Office Action dated Jul. 9, 2013, 3 pages.
China Application 200780017769.2, First Office Action dated Jan. 6, 2012, 6 pages.
China Intellectual Property Office of the People's Republic of China Final Rejection dated Apr. 1, 2012, in Application No. 200680047829.0, 21 pgs.
China Intellectual Property Office of the People's Republic of China Notice of Allowance dated Apr. 9, 2012, in Application No. 200680047831.8, 4 pgs.
China Intellectual Property Office of the People's Republic of China Notice on the First Office Action dated Aug. 4, 2010, in Application No. 200680047831.8.
China Intellectual Property Office of the People's Republic of China Notice on the First Office Action dated Jul. 30, 2010, in Application No. 200680047829.0.
China Intellectual Property Office of the People's Republic of China Notice on the Second Office Action dated Dec. 21, 2011, in Application No. 200680047831.8.
China Intellectual Property Office of the People's Republic of China Notice on the Second Office Action dated Dec. 23, 2011, in Application No. 200680047829.0.
China Intellectual Property Office of the People's Republic of China Response to Notice on the First Office Action dated Aug. 4, 2010, in Application No. 200680047831.8, filed Nov. 29, 2010.
China Intellectual Property Office of the People's Republic Response to China Notice on the First Office Action dated Jul. 30, 2010, in Application No. 200680047829.0, filed Nov. 26, 2010.
China Notice on the First Office Action dated Nov. 12, 2010, in Application No. 200780013376.4.
China Response to Notice on the First Office Action dated Jan. 6, 2012, in Application No. 200780017769.2, filed Feb. 7, 2012.
Chinese Application 200980106136.8, Notice on the Second Office Action dated May 6, 2013 (11 pages).
CN Notice on the First Office Action for Application No. 200980106136.8, dated Aug. 27, 2012 (15 pages).
Edwards, K. "Core Jini" Jun. 1999 (Jun. 1999), PTR Prentice Hall, 1st Edition XP002212106, p. 68—Line 18, p. 79—line 13.
European Amendment filed Aug. 25, 2008 in Application No. 6847989.8.
European Amendment filed Jan. 16, 2009 in Application No. 07809088.3.
European Amendment filed Jan. 26, 2009 in Application No. 07809085.9.
European Amendment filed Sep. 2, 2008 in Application No. 6847984.9.
European Communication dated Aug. 5, 2008 in Application No. 06847984.9.
European Communication dated Dec. 23, 2008 in Application No. 07809088.3.
European Communication dated Dec. 29, 2008 in Application No. 07809085.9.
European Communication dated Jul. 31, 2008 in Application No. 06847989.8.
European International Search Report filed Jan. 14, 2008 in Application No. 07809085.9.
European International Search Report filed Jun. 18, 2007 in Application No. 6847984.9.
European International Search Report filed Mar. 20, 2008 in Application No. 07809088.3.
European Search Report filed Aug. 16, 2007 in European Patent Application No. 06847989.8.
European Supplemental International Search Report filed Jan. 19, 2012 in Application No. 06847984.9.
European Supplemental Search Report filed Jan. 23, 2012 in European Patent Application No. 06847989.8.
Final Office Action dated Jun. 30, 2011 in U.S. Appl. No. 11/434,393.
Final Office Action dated May 21, 2010 in U.S. Appl. No. 11/313,148.
Final Office Action dated Dec. 17, 2009 in U.S. Appl. No. 11/434,394.
Final Office Action dated Sep. 2, 2010 in U.S. Appl. No. 11/434,393.
Final Office Action, U.S. PTO, dated Apr. 24, 2009, regarding U.S. Appl. No. 11/313,148.
Final Office Action, U.S. PTO, dated Apr. 28, 2009, regarding U.S. Appl. No. 11/434,393.
German Response to Communication dated Aug. 6, 2008, filed Sep. 2, 2008, in application No. 07809088.3.
German Response to Communication dated Dec. 23, 2008, filed Jan. 16, 2009, in application No. 07809088.3.
German Response to Communication dated Dec. 29, 2008, filed Jan. 26, 2009, in application No. 07809088.3.
German Response to Communication dated Jul. 31, 2008, filed Aug. 25, 2008, in application No. 07809088.3.
Guttman E., "Service Location Protocol: Automatic Discovery of IP Network Services," IEEE Internet Computing, IEEE Service Center, NY, NY, vol. 3, No. 4, Jul. 1, 1999 (Jul. 1, 1999), XP002140936, pp. 71-80.
International Preliminary Report on Patentability, dated Jul. 3, 2008, regarding Int'l App. No. PCT/US2006/048924.
International Preliminary Report on Patentability, dated Nov. 27, 2008, regarding Int'l App. No. PCT/US2007/011654.
International Search Report for International application No. PCT/US2007/011636, dated Dec. 20, 2007.
International Search Report from corresponding International Application No. PCT/US2006/048934, dated Dec. 20, 2006.
International Search Report dated Dec. 18, 2007 in International Publication No. WO 2007/133785.
International Search Report dated Dec. 20, 2007 in International Publication No. WO 2007/136622.
International Search Report dated Jun. 18, 2007 in International Publication No. WO 2007/075968.
International Search Report dated Jun. 19, 2007 in International Publication No. WO 2007/075961.
International Search Report, dated Jun. 18, 2007, regarding Int'l App. No. PCT/US2006/048934.
Japanese Nominal Appeal and Voluntary Amendment filed Aug. 23, 2010 in Japanese Patent Application No. 2008-547583.
Japanese Notice of Allowance dated, Application No. 2008-547578 (4 pages).
Japanese Notice of Allowance dated Apr. 13, 2012, in Application No. 2009-511029, 4 pgs.
Japanese Notice of Rejection dated Jan. 14, 2011 in Application No. 2008-547583.
Japanese Notice of Rejection dated Sep. 14, 2009 in Application No. 2008-547583.
Korean Application No. 10-2008-7014646, Notice of Allowance dated May 16. 2013, 6 pages.
Non-Final Office Action dated Apr. 13, 2010 in U.S. Appl. No. 11/434,393.
Non-Final Office Action dated Jan. 21, 2011 in U.S. Appl. No. 11/434,393.
Non-Final Office Action dated Nov. 6, 2009 in U.S. Appl. No. 11/313,148.

(56) References Cited

OTHER PUBLICATIONS

Non-Final Office Action dated Oct. 5, 2009 in U.S. Appl. No. 11/434,393.
Non-Final Office Action dated Jan. 30, 2012 U.S. Appl. No. 11/313,148.
Notice of Allowance, dated May 7, 2009, regarding U.S. Appl. No. 11/312,040.
Office Action, U.S. PTO, dated Jun. 25, 2009, regarding U.S. Appl. No. 11/434,394.
PCT International Preliminary Report (Jun. 24, 2008) and Written Opinion (Jun. 19, 2007) on Patentability in International Application No. PCT/US2006/048924.
PCT International Preliminary Report and Written Opinion on Patentability dated Jun. 24, 2008 in International Application No. PCT/US2006/048934.
Response to Japanese Notice of Rejection dated Sep. 14, 2009 in Application No. 2008547583, filed May 11, 2010.
Russian Application 2008145037, Office Action dated Apr. 15, 2011, 4 pages.
Russian Decision to Grant dated Sep. 4, 2011 in Russian Application No. 2008145037.
Supplemental Notice of Allowability dated Jul. 31, 2009 in U.S. Appl. No. 11/312,040.
U.S. PTO Action, dated Dec. 10, 2008, regarding U.S. Appl. No. 11/434,393.
U.S. PTO Action, dated Mar. 28, 2008, regarding U.S. Appl. No. 11/312,040.
U.S. PTO Action, dated Nov. 12, 2008, regarding U.S. Ap. No. 11/313,148.
U.S. PTO Action, dated Oct. 24, 2008, regarding U.S. Appl. No. 11/312,040.
US Amendment filed Aug. 22, 2012, in U.S. Appl. No. 11/434394 (13 pages).
US Amendment filed Nov. 21, 2012, in U.S. Appl. No. 11/313148 (8 pages).
U.S. Appl. No. 12/035531, Amendment and Response filed Aug. 13, 2013, 12 pages.
U.S. Appl. No. 11/313148, Notice of Allowance mailed Jun. 4, 2013, 2 pages.
U.S. Appl. No. 11/434394, Amendment and Response filed Jun. 7, 2013, 7 pages.
U.S. Appl. No. 11/434394, Notice of Allowance dated May 29, 2013, 2 pages.
U.S. Non-Final Office Action dated Aug. 21, 2012, in U.S. Appl. No. 11/313,148 (6 pages).
U.S. Non-Final Office Action dated Sep. 21, 2012, in U.S. Appl. No. 12/035,531 (17 pages).
U.S. Notice of Allowance filed Jan. 10, 2013, in U.S. Appl. No. 11/313,148 (11 pages.).
U.S. Notice of Allowance filed Feb. 25, 2013, in U.S. Appl. No. 11/313,148 (8 pages).
U.S. Notice of Allowance filed Nov. 8, 2012, in U.S. Appl. No. 11/434,394 (12 pages).
Chinese Application 200980106136.8, Notice on the Third Office Action, dated Nov. 18, 2013, 16 pages.
Taiwan Application 96117089, Notice of Allowance dated Oct. 28, 2013, 4 pages.
International Search Report from International Application No. PCT/US01/015099 dated Sep. 25, 2002.
Chinese Application 200980106136.8, Notice on the Fourth Office Action dated Apr. 15, 2014, 15 pages.
Korean Application No. 10-2008-7027393, Notice of Allowance dated Apr. 28, 2014, 6 pages.
Taiwan Application 098103913, Search Report dated Jan. 14, 2014, 1 page.
U.S. Appl. No. 12/035,531, Amendment and Response filed May 8, 2014, 12 pages.
U.S. Appl. No. 12/035,531, Non-Final Office Action dated Feb. 10, 2014, 24 pages.
China Application No. 200680047829.0, Notice on Reexamination, dated Jul. 1, 2014, 13 pages.
U.S. Appl. No. 12/035,531, Final Office Action dated Aug. 29, 2014, 30 pages.
"802.11 broadcast of local info", Retrieved from: http://web.archive.org/web/20050323133626/http://ideas.4brad.com/ archives/000188.html, Mar. 18, 2005, 6 Pages.
"Office Action Issued in Japanese Patent Application No. 2008-547583", dated Apr. 23, 2010, 6 Pages.
"Office Action Issued in Indian Patent Application No. 06016/CHENP/2008", dated Oct. 14, 2016, 2 Pages.
"Office Action Issued in Japanese Patent Application No. 2008-547578", dated Dec. 1, 2011, 5 Pages.
"Office Action Issued in Indian Patent Application No. 06016/CHENP/2008", dated Oct. 11, 2017, 7 Pages.
"Search Report Issued in European Patent Application No. 07754291.8", dated Apr. 12, 2011, 9 Pages.
"Office Action Issued in European Patent Application No. 07809085.9", dated Jun. 13, 2017, 6 Pages.
"Office Action Issued in European Patent Application No. 07809085.9", dated May 22, 2018, 7 Pages.
"Office Action Issued in European Patent Application No. 09713253.4", dated Jul. 4, 2018, 5 Pages.
"Search Report issued in European Patent Application No. 09713253.4", dated Jan. 30, 2017, 8 Pages.
"Office Action Issued in Korean Patent Application No. 10-2008-7014646", dated Dec. 21, 2012, 7 Pages.
"Office Action Issued in Korean Patent Application No. 10-2008-7014771", dated Feb. 27, 2013, 7 Pages.
"Final Office Action Issued in U.S. Appl. No. 11/193,245", dated Oct. 21, 2008, 12 Pages.
"Final Office Action Issued in U.S. Appl. No. 11/193,245", dated Nov. 12, 2009, 11 Pages.
"Final Office Action Issued in U.S. Appl. No. 11/193,245", dated Feb. 26, 2010, 11 Pages.
"Non Final Office Action Issued in U.S. Appl. No. 11/193,245", dated May 22, 2009, 9 Pages.
"Non Final Office Action Issued in U.S. Appl. No. 11/193,245", dated Apr. 8, 2008, 12 Pages.
"Final Office Action Issued in U.S. Appl. No. 11/193,670", dated Apr. 21, 2009, 14 Pages.
"Fifth Office Action Issued in Chinese Patent Application No. 200980106136.8", dated Oct. 20, 2014, 7 Pages.
"Final Office Action Issued in U.S. Appl. No. 11/193,670", dated Mar. 18, 2011, 20 Pages.
"Final Office Action Issued in U.S. Appl. No. 11/193,670", dated Apr. 9, 2010, 19 Pages.
"Final Office Action Issued in U.S. Appl. No. 11/193,670", dated Dec. 5, 2007, 10 Pages.
"Non Final Office Action Issued in U.S. Appl. No. 11/193,670", dated Sep. 21, 2009, 17 Pages.
"Non Final Office Action Issued in U.S. Appl. No. 11/193,670", dated Apr. 2, 2008, 10 Pages.
"Non Final Office Action Issued in U.S. Appl. No. 11/193,670", dated Oct. 16, 2008, 14 Pages.
"Non Final Office Action Issued in U.S. Appl. No. 11/193,670", dated Oct. 7, 2010, 20 Pages.
"Non Final Office Action Issued in U.S. Appl. No. 11/193,670", dated Apr. 27, 2007, 9 Pages.
"Final Office Action Issued in U.S. Appl. No. 11/404,639", dated May 29, 2009, 12 Pages.
"Non Final Office Action Issued in U.S. Appl. No. 11/404,639", dated Dec. 16, 2008, 11 Pages.
"Non Final Office Action Issued in U.S. Appl. No. 11/973,589", dated Feb. 28, 2011, 10 Pages.
"Final Office Action Issued in U.S. Appl. No. 12/035,531", dated Jun. 7, 2013, 21 Pages.
"Final Office Action Issued in U.S. Appl. No. 12/035,531", dated Jun. 28, 2011, 11 Pages.
"Final Office Action Issued in U.S. Appl. No. 15/420,797", dated Nov. 19, 2018, 22 Pages.
"Non Final Office Action Issued in U.S. Appl. No. 15/420,797", dated Apr. 27, 2018, 20 Pages.

(56) References Cited

OTHER PUBLICATIONS

"Third Office Action Issued in Chinese Patent Application No. 200680047829.0", dated Mar. 31, 2015, 6 Pages.
"Office Action Issued in European Patent Application No. 09713253.4", dated Apr. 10, 2019 5 Pages.
"Non Final Office Action Issued in U.S. Appl. No. 15/420,797", dated May 21, 2019, 28 Pages.
"Final Office Action Issued in U.S. Appl. No. 15/420,797", dated Sep. 26, 2019, 19 Pages.

* cited by examiner

NOTIFICATION FRAMEWORK FOR WIRELESS NETWORKS

RELATED APPLICATIONS

This Application is a continuation-in-part of and claims the benefit under 35 U.S.C. §120 of U.S. application Ser. No. 11/434,393 (now Abandoned), titled "Services near me: Discovering and connecting to available wireless services utilizing proximity discovery" filed on May 15, 2006, which is herein incorporated by reference in its entirety.

This Application is a continuation-in-part of and claims the benefit under 35 U.S.C. §120 of U.S. application Ser. No. 11/973,589 (now Abandoned), titled "Advertising framework for wireless networks," filed on Oct. 9, 2007, which is herein incorporated by reference in its entirety.

BACKGROUND

Wireless communication technologies such as 802.11x, Ultrawideband (UWB), and Bluetooth enable devices to communicate wirelessly over a relatively short range, e.g., less than 100 meters. To discover other wireless devices, a device broadcasts wireless messages and listens for wireless messages from other devices. If another device is discovered, a wireless connection may be established between the devices. Once a connection is established, devices may exchange various types of information. For example, devices may exchange information related to providing a service (e.g., printing, headset connectivity, PDA synchronization, etc.) provided by one of the devices.

A variety of services may be provided by communicating wirelessly between devices. As one example, a laptop computer may communicate wirelessly with a printer to print documents. Once a wireless connection is established between the computer and the printer, the computer may discover the print services provided by the printer. The computer may then take advantage of printing services offered by the printer via the wireless connection.

Previously developed IP-based methods of discovering services require a connection to be established with a device before services provided by a device can be discovered. For example, network discovery protocols such as SSDP (Simple Service Discovery Protocol), WS-Discovery (Web Services Discovery), and SLP (Service Location Protocol) require network layer connectivity (Layer 3 of the OSI model) to be established prior to the discovery of services on the network. Once connected, services provided by a device send broadcast or multicast messages over the IP network to advertise their services. Previously developed IP-based methods of service discovery did not provide a way of determining whether the device that provides the service was in the proximity of the device that required the service. Bluetooth as a technology has some ability to perform wireless service discovery limited to specific profiles.

Previous computing platforms provided different tools for users to establish connections to different types of devices. For example, if a laptop user wishes to connect to a wireless access point for Internet service, the user may use a dedicated control panel to connect to the desired access point. If the user wishes to communicate with a Bluetooth device, a dedicated Bluetooth wizard may be required to set up the connection. If the user wishes to connect to a Bluetooth-enabled printer, a printer setup wizard may be required.

SUMMARY

In prior systems, services provided by a device could be discovered after establishing a connection with the device. The Applicants have appreciated that it may be desirable to discover a service provided by a device prior to establishing a connection with the device. Enabling a uniform way of discovering services prior to establishing a connection may facilitate finding a desired service in an 802.11x, Ultrawideband (UWB), Bluetooth, WiMax, GPRS, or other suitable wireless environment. Such discovery may be particularly useful in a wireless context in which a wireless signal may only be transmitted effectively over a relatively short distance, since service discovery may therefore be limited to only those devices within suitable proximity of the user. For example, a computer user entering an unfamiliar building may wish to determine whether she can print a document using a nearby printer. The user may not wish, however, to establish a connection with a local wireless network or individual device only to find out whether a suitable printer is located nearby.

In accordance with one aspect of the invention, the user may send a wireless request from her computer effectively asking local devices whether a suitable print service is offered. In response, a printer or other device acting on behalf of the printer may send a response to the computer indicating the type of print service(s) that are available. Based on this information, the user's computer may establish a connection with the network and/or a particular device (such as a printer) to obtain the desired services. In another implementation of service discovery, the user's computer may passively listen to service messages advertised by nearby devices. Once the user's computer receives an appropriate service message, the user may establish a connection with the device to obtain the desired service. Thus, discovery of services is provided prior to establishing a connection with the device that provides the service.

In accordance with another aspect of the invention, the user's device, e.g., computer, may display a graphical user interface that enables the user to view the services available in the area, also called the "services near me." The graphical user interface (GUI) can display a list of available services of a variety of different types. For example, the list of available services can include services available on Bluetooth devices, wireless printers, wireless access points, and/or any other suitable types of devices. Thus, the user can view a comprehensive list of services provided nearby regardless of the types of services provided or the wireless standard by which the devices communicate. To connect to the desired service, the user may simply select the desired service and click a "Connect" button. The Applicants have appreciated that a computer user may not be particularly interested in understanding the details of a connection, but may simply wish to easily find and use the desired service. Providing a unified framework for discovering services can simplify finding and accessing the desired service.

One embodiment of the invention relates to a method of accessing a service. The method includes receiving, via a first type of wireless protocol, a first wireless message that includes information related to a first service. The method also includes receiving, via a second type of wireless protocol, a second wireless message that includes information related to a second service. The information related to the first service and the information related to the second service are simultaneously displayed with a single user interface. User input is received indicating a service selected using the user interface, and the service is accessed Another embodiment of the invention relates to a computer-readable medium having computer-executable instructions for performing steps of a method of accessing, by a first device, a service provided by a second device. The second device is in the proximity of first device. The method includes receiving a wireless message that includes information related to the service provided by the second device. Information related to the service is displayed, prior to establishing a connection between the first device and the second device that is suitable for providing the service. User input is received indicating that the service has been selected. A connection is established between the first device and the second device in response to receiving the user input.

A further embodiment of the invention relates to a graphical user interface (GUI) that displays content to a user of a first device and enables the user to select a desired service. The GUI allows the user to establish a wireless connection with a device that provides the desired service. The GUI includes a first portion that displays first content related to a first service, based on information received wirelessly from a second device in a proximity of the first device. The GUI also includes a second portion that displays second content related to a second service, based on information received wirelessly from a third device in a proximity of the first device. The third device and the second devices are different types of devices that provide different types of services. The first portion and the second portion are displayed simultaneously.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
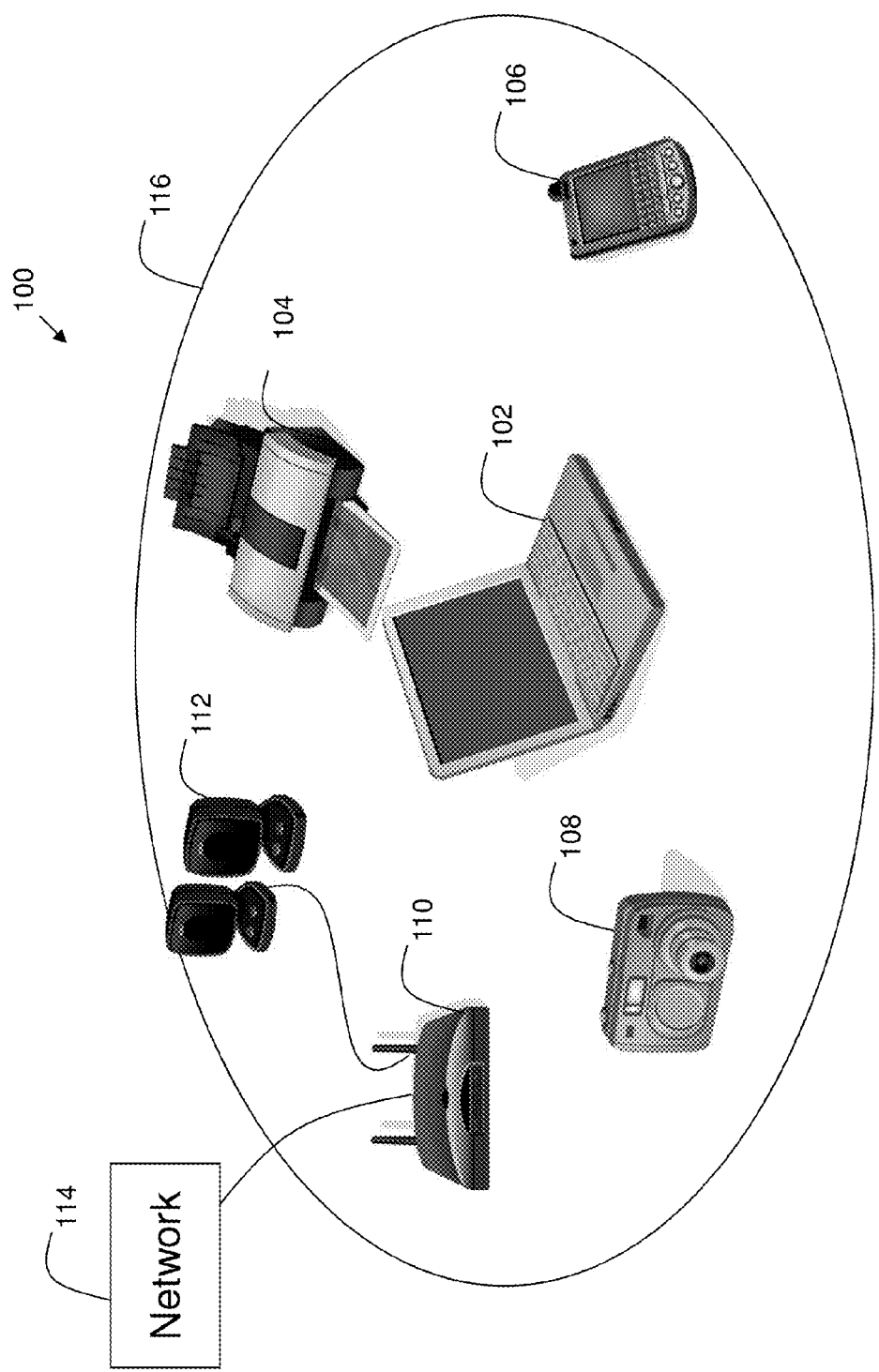
FIG. 1 is diagram illustrating an example of a computing environment in which services may be discovered, according to some embodiments of the invention.

As discussed above, prior wireless network arrangements typically required a user to establish a connection with a device and/or with the network to determine whether a desired service is offered. For example, a guest may bring a laptop computer to a meeting in an unfamiliar office building. If he wishes to print a document, he may first have to establish a connection between his laptop and a local network within the office building. After a connection is established, the laptop computer may determine if a printer is connected to the network. There may be many printers available on the network, some of which are nearby and some of which may be far away, such as on a different floor of the building. In some cases, it may be difficult to determine which printers are nearby. Furthermore, it may be undesirable to provide guests with access to the local network for security reasons. For example, connecting to the local network may allow the guest access to confidential information stored on the network.

As another example, several wireless devices, e.g., printers capable of communicating wirelessly, may be present in the proximity of the wireless-enabled device. In previous systems, a device that desires a particular service from another device would first have to connect to a device and then determine the services that it provides. It may be time consuming to connect to several devices until a device is found that provides the desired service.

As a further example, users of portable video game devices may wish to find other users in their proximity that are playing the same game. The users may wish to play together over a wireless connection. However, in crowded areas such as airports and coffee shops there may be many wireless devices in the area, and it may be difficult to determine which devices have the capability of playing the same game, without trying to connect to multiple devices.

In accordance with aspects of the invention, discovery of services prior to establishing a connection with a device may enable a user of a wireless-enabled device (e.g., a laptop computer, PDA or telephone) to find a device that provides a desired service in the proximity of the wireless-enabled device. For example, in one aspect of the invention, a service provided by a local device may be discovered by sending and receiving radio messages prior to establishing a connection with the device. The services that are discovered are likely to be nearby because they are within the radio range of the wireless-enabled device seeking the service(s). For example, if a person brings a laptop to a meeting in an unfamiliar office building, the laptop may exchange wireless messages with devices nearby. His laptop screen may display a list of devices that provide services nearby, e.g., nearby wireless printers, and the types of services they provide. He may then select an appropriate device with which a wireless connection will be established. As a result, obtaining the desired service may be facilitated.

In one implementation, a wireless-enabled device may send radio messages to discover services provided by other devices and may actively seek out a particular service. In another implementation, the device may passively discover services by listening to advertised service messages provided by other local devices. Either an active implementation, passive implementation, or a combination of the two may be used to discover services. Any suitable implementation may be used to discover services, as the invention is not limited in this respect. Embodiments of the invention may be used with any suitable wireless technology, such as IEEE standard 802.11, Bluetooth, UWB, Worldwide Interoperability for Microwave Access (WiMax), and cellular protocols, e.g., general packet radio service (GPRS).

In accordance with the invention, the wireless-enabled device, e.g., the person's laptop, may run a graphical user interface (GUI) that displays for the user the services available wirelessly nearby. When the GUI is run, it may automatically determine which services are nearby using the active implementation, passive implementation, a combination thereof, or another suitable technique. A list of services that are available nearby are then displayed for the user. The user may examine the list of services, and select from the list a desired service. Once the desired service has been selected, a wireless connection may be established between the person's laptop and the device that provides the selected service.

The Applicants have appreciated that prior computing systems did not enable a user to view a list of services across wired and wireless networks that the user can access, prior to establishing a connection with the devices that provide the services. In one aspect of the invention, a GUI is provided that can display a list of services available wirelessly in the proximity of a wireless-enabled device, prior to establishing a connection with the devices. Displaying services prior to establishing a connection may facilitate accessing a desired service because a user can view a comprehensive list of services available in the area, and only needs to establish a connection with the device that provides the desired service.

The Applicants have further appreciated that prior computing systems did not provide an integrated framework for accessing services. As discussed above, different control panels and wizards were needed depending on the type of service and the type of wireless connection the user wished to establish. To access the desired service, the user may have to figure out which wizard and/or control panel is needed for the particular service the user is trying to access. In one aspect of the invention, a GUI provides an integrated framework for accessing services regardless of the type of service that is desired or the wireless protocol that will be used. Thus, any suitable service can be accessed using a single GUI, without the need for a user to navigate and understand multiple different wizards. Providing an integrated service discovery framework in a single GUI can facilitate finding and accessing desired services.

FIG. 1 is a diagram illustrating an example of a computing environment 100 in which devices may communicate regarding service discovery according to some embodiments of the invention. FIG. 1 illustrates an example of a wireless-enabled device 102, e.g., a laptop computer, and examples of other devices with which device 102 may communicate wirelessly, including: printer 104, personal digital assistant (PDA) 106, camera 108 and access point 110. FIG. 1 also illustrates an example of a speaker system 112 and wired network 114 that are communicatively coupled to access point 110. Devices in the computing environment 100 may communicate wirelessly using any suitable wireless standard such as 802.11x, Bluetooth or Ultrawideband (UWB).

Wireless-enabled device 102 may be a laptop computer or any other device configured to send and receive wireless communications, such as a PDA, a cell phone, or any other suitable device. Wireless-enabled device 102 may be configured to interface with a human user, i.e., using a screen, keyboard, touchpad and/or any other suitable interface.

A user of wireless-enabled device 102 may desire a particular service. For example, the user may wish to establish a wireless connection between wireless-enabled device 102 and a printer for printing documents. The user may command wireless-enabled device 102 to find a particular service, e.g., a print service.

Figure 2:
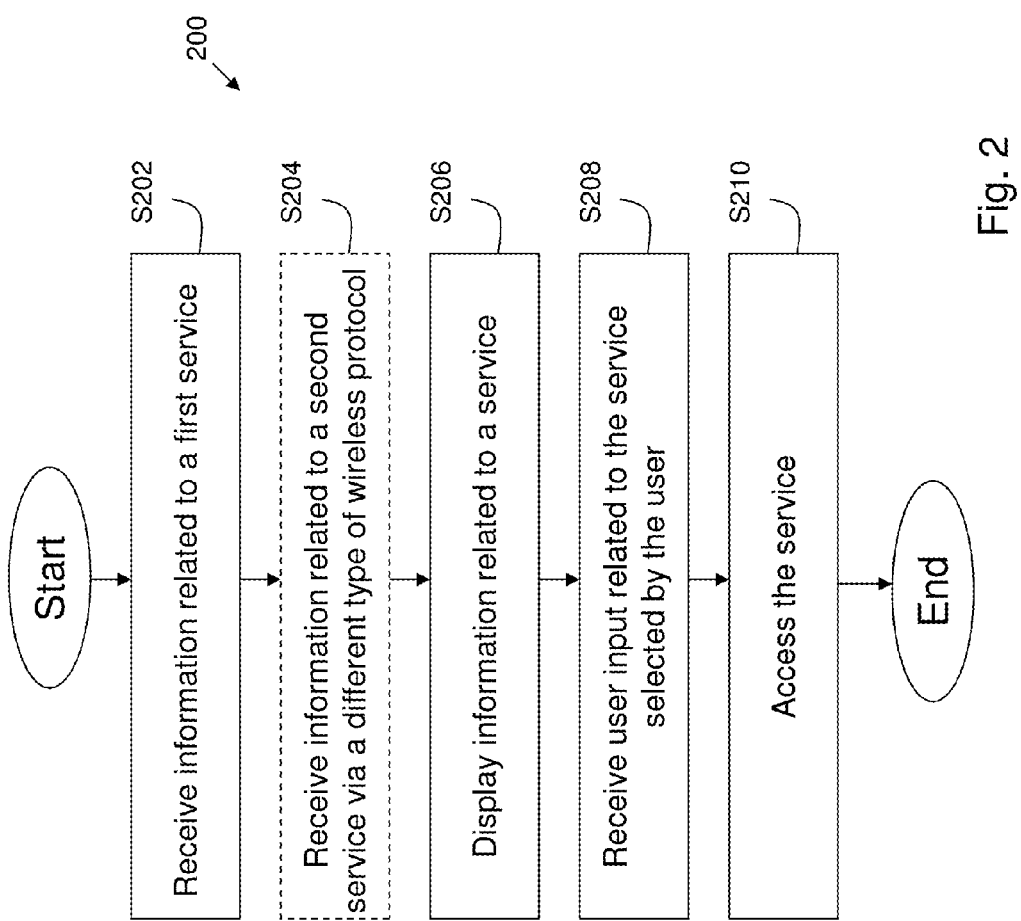
FIG. 2 is a flowchart illustrating an example of a method of accessing a service, according to one embodiment of the invention.

FIG. 2 illustrates an example of a method 200 of accessing a service that may be used by device 102 in the environment shown in FIG. 1. In one embodiment of the invention, wireless-enabled device 102 may passively listen to determine which services that are available. Devices that provide one or more service(s) may send an advertisement message to advertise the service(s) they can provide to device 102 and/or other devices in range. The advertisement message may be a radio message that advertises a particular service, e.g., a printing service, provided by the device, e.g., printer 104. In one aspect of the invention, the advertisement message may be broadcast as part of an 802.11x or UWB beacon message. This broadcast may be included in OSI Layer 2 communications prior to establishing Layer 3 connectivity between the devices. The advertisement message may be encoded with information about the service provided by the device. For example, the advertisement message may include an information element (IE), which is a data structure for wirelessly sending service-related information. One or more advertisement messages may be sent (without prompting by a request message) that include information related to one or more services provided by the device. The advertisement messages may be broadcast repeatedly. As one example, the advertisement message may be broadcast periodically.

As illustrated in FIG. 1, devices that send the advertisement messages may be present in the proximity 116 of wireless-enabled device 102. The proximity 116 of wireless-enabled device 102 may be defined by the radio range of wireless-enabled device 102 and/or a range of devices receiving the request message. As one example, the proximity 116 of wireless-enabled device 102 may include the space within approximately 100 meters of wireless-enabled device 102. The radio range may be greater than or less than 100 meters depending on various factors including the technology used, the strength of the transmitter, the amount of noise present on the channel, the physical environment in which wireless-enabled device 102 operates, etc. However, the proximity 116 of wireless enabled device 102 need not necessarily be defined by the radio range, but may be determined based on other factors.

In step S202, wireless-enabled device 102 may receive a wireless message that that includes service information related to a first service. For example, wireless-enabled device 102 may receive a wireless message from digital camera 108 that advertises a photo service. For example, digital camera 108 may be accessed to upload digital photos or video to wireless-enabled device 102. The wireless message may be received via a first type of wireless protocol used by digital camera 108 and wireless-enabled device 102. For example, the wireless message may be received via UWB using service discovery techniques in accordance with the invention, prior to establishing a UWB connection between digital camera 108 and wireless-enabled device 102. However, the wireless message received in step S202 may be from any suitable device and may be received via any suitable protocol, as the invention is not limited in this respect.

In step S204, wireless-enabled device 102 may receive a wireless message from another device in the network. The wireless message may include service information related to a different service. For example, the service information may include information about a print service provided by printer 104. The wireless message may be received via a different type of wireless protocol than the wireless protocol used by digital camera 108 and wireless-enabled device 102. For example, the wireless message from printer 104 may be received via an IEEE 802.11 beacon message using service discovery techniques in accordance with the invention, prior to establishing an IEEE 802.11 connection between printer 104 and wireless-enabled device 102. However, the wireless message received in step S204 may be from any suitable device and may be received via any suitable protocol, as the invention is not limited in this respect. In some embodiments of the invention, step S204 need not be performed. For example, step S204 may not be performed if there is only one wireless device in the proximity of wireless-enabled device 102, or if all of the devices in the proximity of wireless-enabled device 102 use the same wireless protocol.

In step S206, wireless-enabled device 102 may display the information related to one or more services. The information related to the services may be displayed prior to establishing a connection with the devices, and information related to multiple different services can be displayed simultaneously in a single graphical user interface window. For example, a liquid crystal display (LCD) screen associated with wireless-enabled device 102 may display information about the digital camera service and the print service. As another example, the GUI may be displayed on a digital camera screen, a PDA screen, or any other suitable human perceptible medium. Any suitable medium may be used, as the invention is not limited as to the medium that is used for displaying information. In one embodiment of the invention, the information about the services may be displayed as a list. A user may use any suitable controls to scroll through the list, and possibly select from the list a desired service.

In step S208, wireless-enabled device 102 may receive user input related to a service selected by the user. The user input may be received in any suitable way, for example, via a mouse, keyboard, touchpad, stylus, or any other suitable input device. In response to receiving the user's input indicating that a service has been selected, the GUI may highlight the selected service to visually indicate to the user that the service has been selected. If desired, the user may initiate a connection with the device that provides the service. For example, the user may initiate the connection by clicking a "Connect" button, double-clicking on the area of the GUI associated with the service, or by providing any other suitable input. As one example, the user may select a print service from the list, and may initiate a connection with printer 104 to access the print service.

In step S210, wireless enabled device 102 may establish a connection with printer 104, in response to receiving the user input. In some circumstances, a device such as printer 104 may require authentication for a connection to be established. If authentication is required, the user of wireless-enabled device may be prompted to enter a password, pin or other identification number such as an identification number derived from biometric information, e.g., a fingerprint, or retinal scan. Authentication may be provided using any suitable security protocol, such as IPsec. Authentication may alternately be based on payment or billing information, e.g., so that services are only provided once a payment agreement has been reached. If the authentication is successful, a connection may then be established.

Once a connection has been established between a wireless-enabled device and a device that provides a service, the devices may communicate further with respect to providing the requested service. For example, wireless-enabled device 102 may communicate wirelessly with printer 104 to print documents.

As applied to 802.11x, UWB or any other suitable wireless standard, the term "establishing a connection" means that a first device sends a connection request to a second device and the second device responds to agree on the connection parameters and accept the connection. The connection that is established may be suitable for providing a service. In an 802.11 context, service discovery messages may be sent and received via Layer 2 802.11 beacon and probe messages. However, Layer 2 messages may not provide the capability for wirelessly providing a large amount of information describing the service, e.g., a print service. Services may be advertised using Layer 3 or higher layer messages, in which a connection has been established that is suitable for providing the service. In an IEEE 802.11 context, service discovery may be provided using wirelessly broadcast beacon messages. Once a first device receives a beacon message that includes information related to a service provided by a second device, the first device may send an association request to the second device. The association request may contain information about the parameters of the connection that is to be established. Once the second device receives the association request, it may respond with an association response message that indicates agreement on the connection parameters and acceptance of the connection. The connection may be considered as established once the first device receives the association response message. In a Bluetooth context, service discovery may be provided using inquiry and inquiry response messages. However, a connection may not be considered as established until page and page response messages have been exchanged. Once these messages have been exchanged, the devices may be synchronized with one another because a particular frequency hopping pattern has been agreed upon. As another example, the two devices may have agreed on times for transmitting and/or receiving data. These are examples of situations in which a connection has been established that is suitable for providing a service. However, it should be appreciated that any suitable wireless technologies may be used, and any communication scheme, timing pattern, frequency pattern or other communication means may be established that is suitable for providing a service.

The embodiment of the invention described above with respect to FIG. 2 is a "passive" implementation in which a device that seeks to access a service passively listens for wireless advertisement messages from devices that provide services. However, in an "active" embodiment of the invention, wireless-enabled device 102 may send out a wireless request signal effectively asking other devices in the area whether they provide a desired service. Once a device receives the wireless message, it may send a wireless response signal to indicate that it provides the requested service. The wireless response signal, like the advertisement signal discussed above, may include an information element (IE) that provides information about the service.

In another embodiment of the invention, a combination of "active" and "passive" service discovery may be used. Such a combination will be described as "hybrid" service discovery. In hybrid service discovery, a device that provides a service may send out a truncated IE that contains less information than a full IE. Once the device that seeks the service receives the truncated IE, it may send a wireless request message to the device that provides the service. In response to the wireless request message, the device that provides the service may respond with a wireless response message that includes the full IE that includes more detailed information related to the service.

Any of the above-described service discovery implementations may be used, including active, passive and hybrid service discovery, as the invention is not limited as to the particular manner in which service discovery is provided. In the case of IEEE standard 802.11, the wireless advertisement and response messages may be sent via an 802.11 beacon signal, while the wireless request messages may be sent via an 802.11 probe signal. However, the invention is not limited to an 802.11 context, as any suitable wireless standard may be used.

As discussed above, information about services can be displayed in a GUI that a user may manipulate to find, select and connect to services. In some embodiments of the invention, the GUI may provide an integrated framework for discovering services provided by a variety of different devices and via variety of different wireless protocols. Providing a integrated GUI for service discovery may simplify service discovery by providing a single means of accessing services. Thus, navigating multiple wizards and control panels may no longer be necessary for accessing services. An example of a GUI that may be used to implement aspects of the invention will now be described with reference to FIGS. 3-11. The GUI may be run on any suitable wireless-enabled device, such as wireless-enabled device 102.

Figure 3:
FIG. 3 illustrates an example of a graphical user interface window for displaying to a user the progress made in finding services.

FIG. 3 illustrates an example of a graphical user interface window 300 that may be displayed upon starting the GUI. Window 300 visually indicates that the device, e.g., wireless-enabled device 102, is searching for services (using an active, passive, hybrid or other suitable implementation). Window 300 may include a status bar 302 that visually indicates to a user the progress of wireless-enabled device 102 in finding services in the area.

Figure 4:
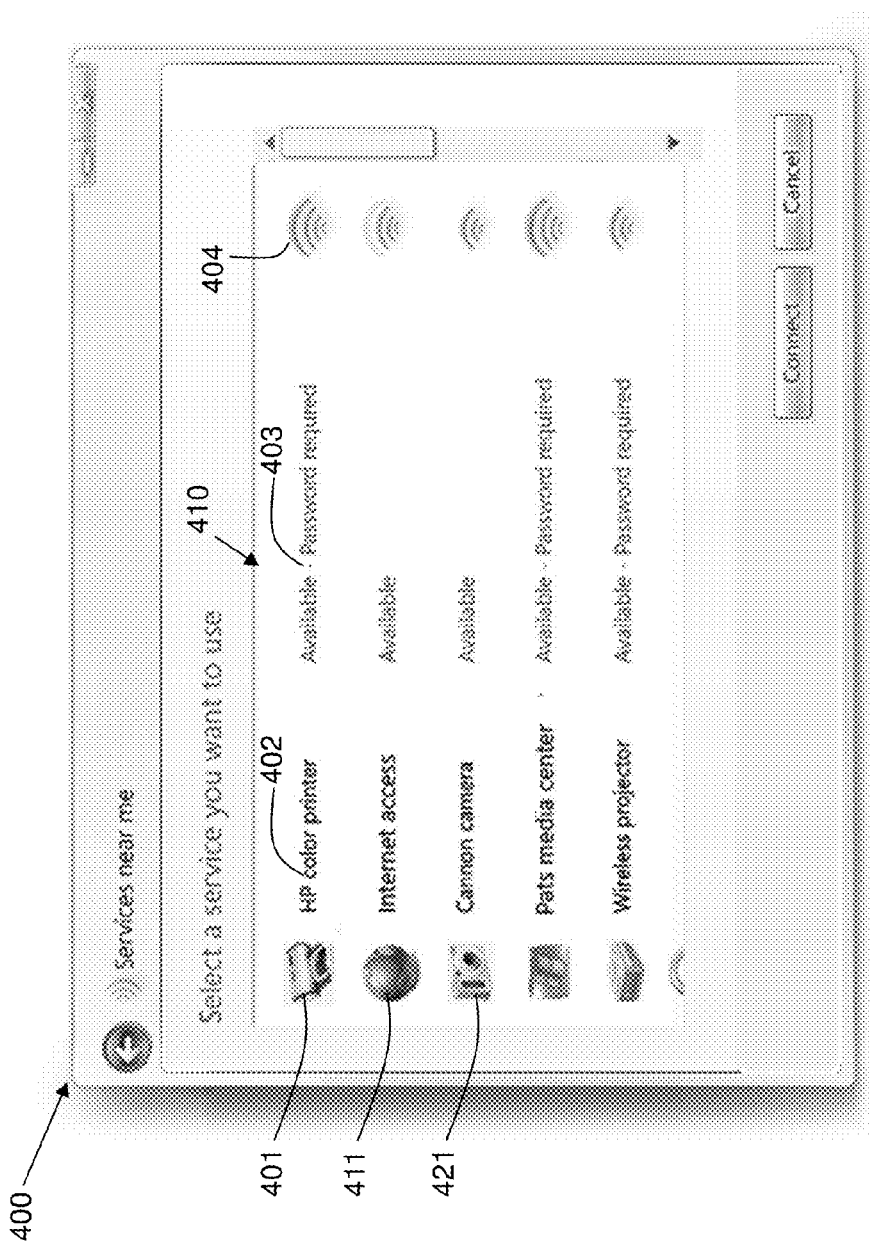
FIG. 4 illustrates an example of a graphical user interface window that displays information about multiple services that may be accessed wirelessly.

FIG. 4 illustrates an example of a graphical user interface window 400 that may be displayed once at least one service has been discovered. Graphical user interface window 400 displays a list 410 of services in the proximity of wireless-enabled device 102. In this example, list 410 includes information about a printing service. The information about the printing service is displayed in the upper portion of list 410. The information about the printing service includes an icon 401, service name 402, service status indicator 403, and signal strength indicator 404.

Icon 401 may display a visual representation, e.g., a picture, sketch, photograph, etc., of a particular service. In this example, list 410 includes icon 401, which is a picture of a printer and represents the printing service provided. Similarly, a projector service may be represented by a projector icon, and a camera service may be represented by a camera icon. Icon 401 may be any suitable visual representation. In one implementation, icon 401 may be an advertisement designed to catch the eye of a user, and to encourage the user to select that particular service, as will be discussed in further detail below.

Service name 402 may be text that lists the name of the particular service. For example, the name of the service may be "HP color printer." Service name 402 may provide information to a user about the type of service that is offered. However, any suitable text, characters, or other visual representations may be used. For example, service name 402 may include text that provides advertising information, as will be described in further detail bellow.

Service status indicator 403 may be text that indicates the status of the particular service. For example, a service may have a status of "Available," "Unavailable", or "Available—Password Required." If the status is "Available," the user may be able to establish a connection with the device that provides the service. If the status is "Unavailable," the user may be not able to establish the connection. If the status is "Available—Password Required" the user may be able to establish the connection once the user provides a suitable password or other appropriate authentication information. However, any suitable service status may be displayed, as the invention is not limited in this respect.

Signal strength indicator 404 may be a visual indicator that represents the strength of the wireless signal. For example, a large number of curved lines may indicate that the signal strength is relatively strong, and a small number of curved lines may indicate that the strength is particularly weak. However, any suitable way of visually representing the signal strength may be used. To determine the signal strength, the wireless-enabled device may take advantage of a mechanism provided by the wireless protocol for determining the wireless signal strength.

Figure 5:
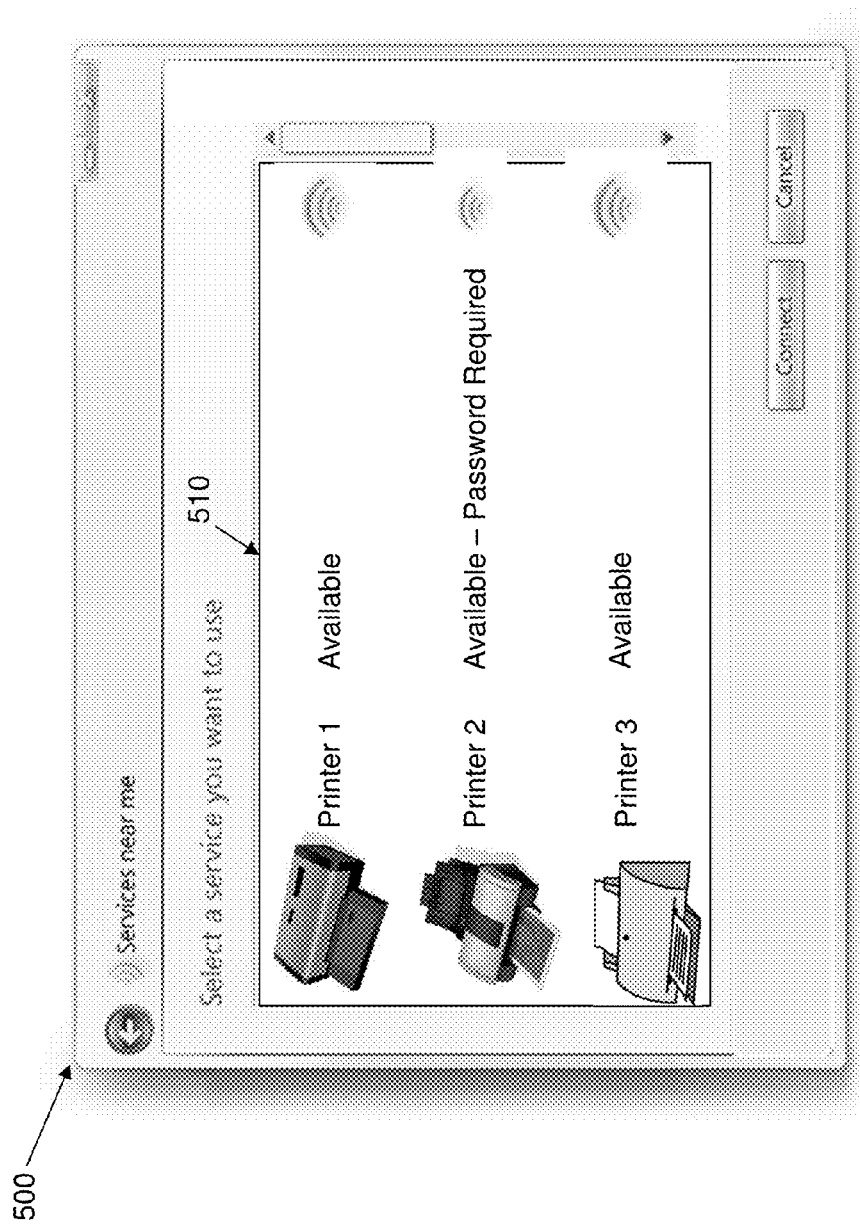
FIG. 5 illustrates an example of a graphical user interface window in which the services displayed have been filtered so that only print services are displayed.

In one embodiment of the invention, the services that are displayed in the graphical user interface window may be filtered according to one or more criteria. For example, a user may only wish to view print-related services to facilitate finding an appropriate printer. To view only print-related services, the user may use a suitable tool or menu associated with the GUI to provide input that indicates that the services that are displayed should be limited to print-related services. In response to receiving this input, the GUI may filter the list of services so that a list is generated that includes only print-related services. Such a filter may be a software component of the GUI that examines a "service type" field of a received IE associated with each service. Any suitable criteria may be used to filter the list of services that are displayed. For example, the list may be limited to particular types of devices that provide the services, particular types of services, services that have a certain level of signal strength, services that do not require a password, services that are free and do not require a credit card, or any other suitable criteria. In some circumstances, one or more criteria may be determined by the device that runs the GUI, instead of or in addition to the criteria determined by a user. As one example, a user playing a video game may select an option within the game to play in multi-player mode. Accordingly, wireless-enabled device 102 may filter the list of services to only display services associated with other users in the vicinity who are playing the same game on their wireless-enabled devices. As another example, if a user is using a word processor and chooses to print a document, wireless-enabled device 102 may understand that the user is looking for a printer and automatically filter the list of devices so that only a list of printers is displayed. FIG. 5 illustrates an example of a graphical user interface window 500 that displays services that have been filtered to include only print services. Graphical user interface window 500 includes a filtered list of services 510.

As discussed above, the GUI may display one or more advertisements. For example, the advertisements may relate to services available in the proximity of wireless-enabled device 102. The services may be available via the wireless connection e.g., print services, however the invention is not limited in this respect, as the services that are advertised need not necessarily be available via a wireless connection. For example, a wireless access point in an airport may send out messages to advertise services such as dining options that are available in the proximity of a terminal. Such advertisements may appear in the list of available services along with services that are available via wireless connections.

Figure 6:
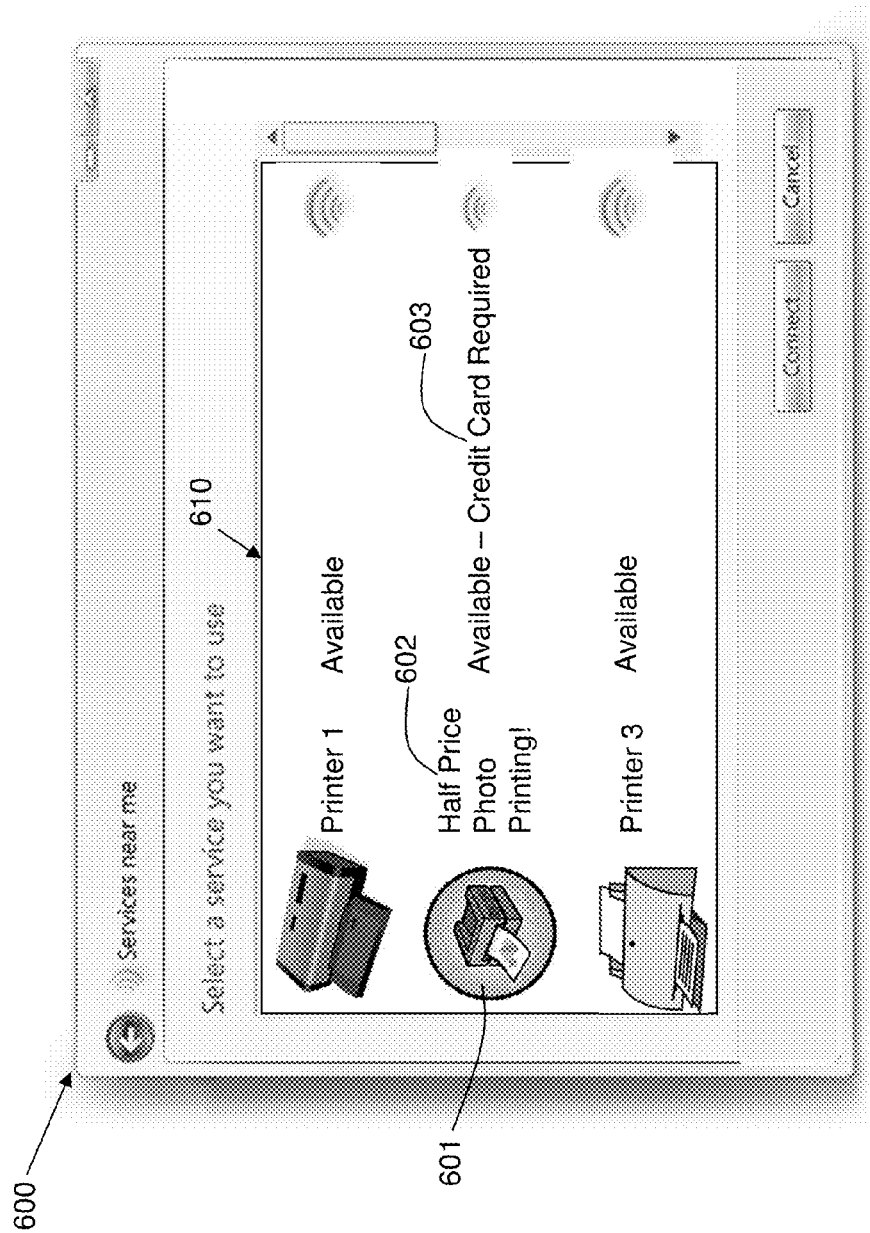
FIG. 6 illustrates an example of a graphical user interface window in which an advertisement is displayed.

FIG. 6 illustrates an example of a graphical user interface window 600 that displays an advertisement. The advertisement includes icon 601 and service name 602 advertising a photo printing service that is available. In this example, a cellular phone user may be walking through a shopping mall with a cellular phone that contains digital photos that the user wishes to print. When the user comes into the proximity of a photography store or kiosk, the cellular phone may exchange information with a wireless device (associated with the store or kiosk) that advertises photo printing services. In accordance with the invention, the advertisement is displayed prior to establishing a connection with the device. To take advantage of the photo printing service, the user may establish a connection with the device that advertised the service via the GUI. To establish a connection, the user may be required to enter payment information, such as a credit card number. If the user's credit card is accepted, the connection between the cellular phone and the device may be allowed. The cellular phone may then wirelessly send the digital photos to the device, which may print the photos at a photography store or kiosk near the user. The user may then pick up the photos at the store or kiosk. Any suitable advertisement(s) may be provided in window 600, as the invention is not limited as to the type or number of advertisements that are provided.

Figure 7:
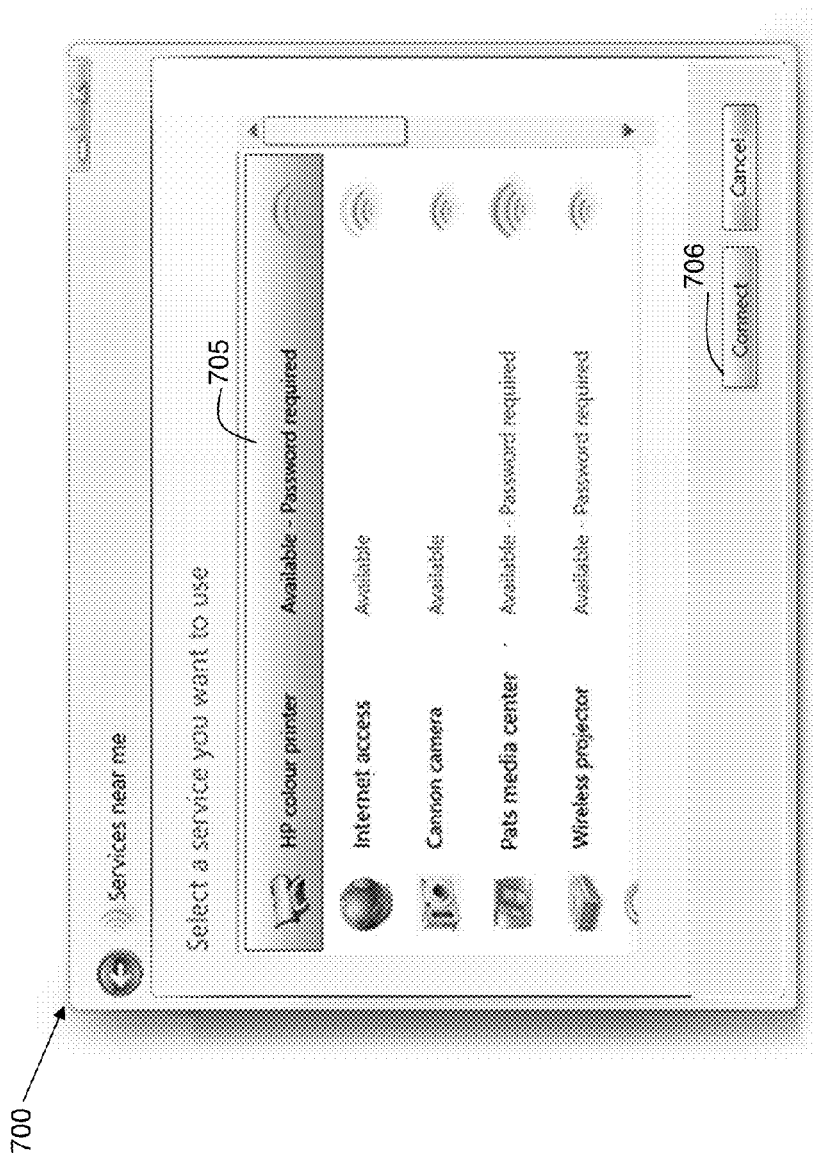
FIG. 7 illustrates an example of a graphical user interface window in which a service has been selected.
Figure 8:
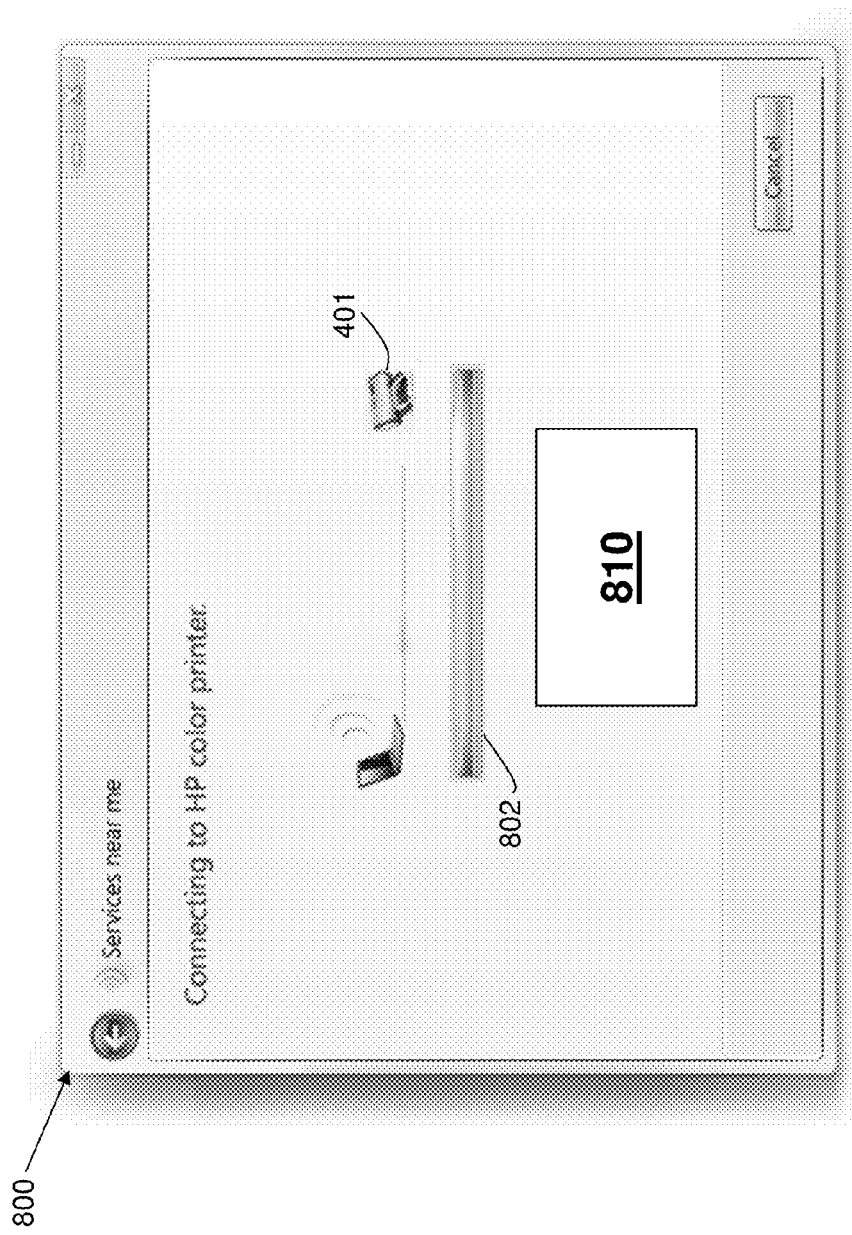
FIG. 8 illustrates an example of a window that displays an advertisement and the progress made in establishing a connection.

Continuing now with a description of the GUI, FIG. 7 illustrates an example of a graphical interface window 700 in which a first service has been selected by a user, as indicated by highlighted portion 705. The service may be selected by the user in any suitable way, as discussed above. If the user desires to connect with the selected service, the user may click on the "Connect" button 706, or provide any other suitable indication that a connection should be established FIG. 8 illustrates an example of a graphical user interface window 800 that illustrates to a user that wireless-enabled device 102 is connecting to the wireless printer, as represented by icon 401. Window 800 may include a status bar that represents the progress that has been made in connecting to the wireless printer. In one embodiment of the invention, an advertisement 810 may be displayed prior to allowing the user to access the desired service. For example, an advertisement 810 may be displayed as a portion of window 800. As another example, the advertisement may be displayed in a separate window. Any suitable advertisement may be presented, such as still advertisements, video advertisements, audio advertisements, or any combination thereof. The advertisement may be related to the desired service, or may not be related to the desired service, as the invention is not limited in this respect.

Figure 9:
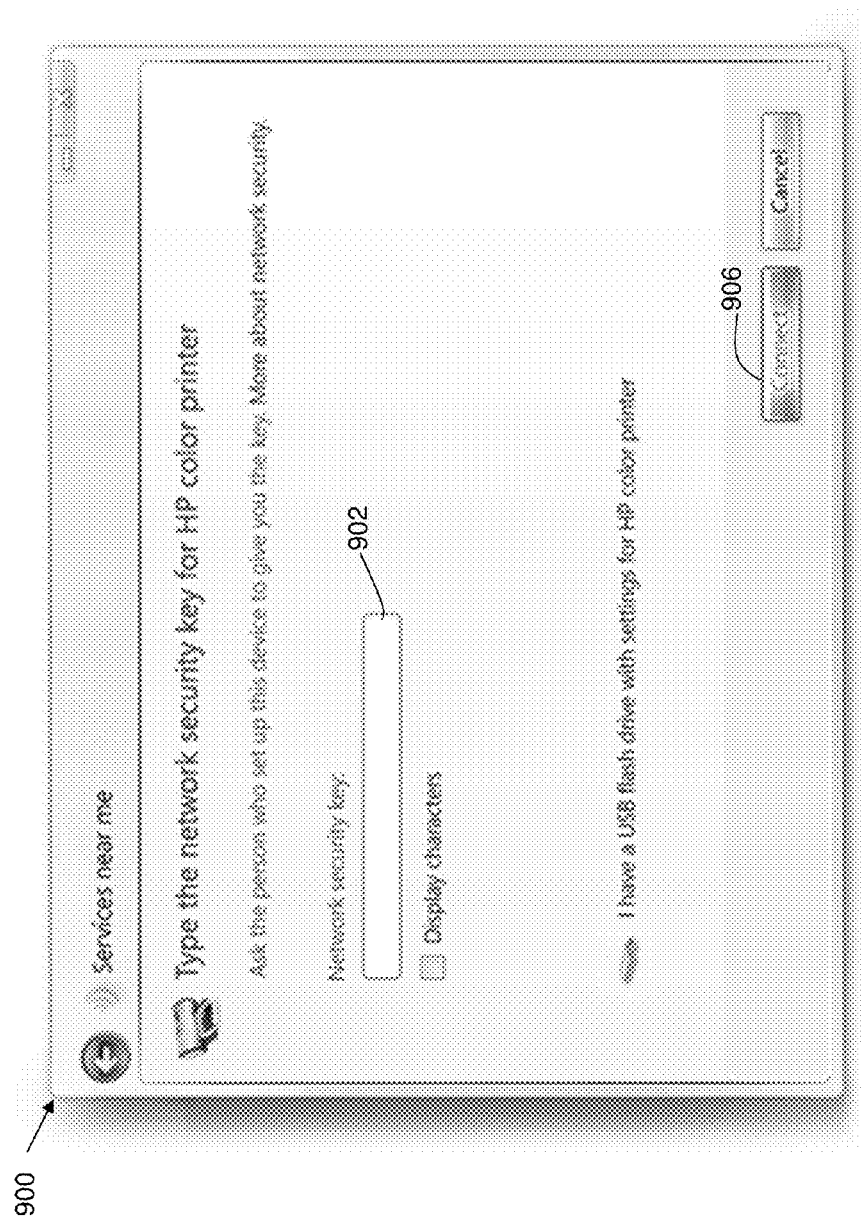
FIG. 9 illustrates an example of a graphical user interface window in which a user may provide security information prior to establishing a wireless connection.

FIG. 9 illustrates an example of a graphical user interface window 900 that requires a user to enter a security key in field 902 prior to allowing the user access to the service, or a connection to the device that provides the service. Any suitable security key may be used, such as a password or credit card number for the credit card that will be charged for the service. Once the appropriate key has been entered, the user may continue with the process of accessing the service by clicking a "Connect" button 906. In some embodiments, a security key need not be entered. For example, the service may not require authentication for a user to access the service. As another example, the user and/or device may be on a "permitted list" of users and/or devices that are allowed to access the service without authentication. The permitted list may be a list of trusted users and/or devices that is maintained by the device that provides the service, or any other suitable device. Users and/or devices that are not on the preferred list may be required to enter the security key before accessing the service. The preferred list may include unique identifiers, e.g., UUIDs, for the trusted devices. The security key need not be entered by the user, but key may be derived from biometric information such as a fingerprint or retinal scan, or determined in any other suitable way.

If a security key is required, the advertisement may not be displayed in window 800, as discussed above. Rather, the advertisement may be displayed in another window after the authentication procedure has been successful. Waiting until the connection has been established to display an advertisement may enable sending a more detailed or data intensive advertisement, e.g., video, than was possible before the connection was established. Once the connection is established, the an advertisement may be displayed prior to allowing the user access to the desired service. However, in some embodiments of the invention, the GUI may display no advertisements whatsoever, as advertisements are provided merely to illustrate the type of content the GUI is capable of presenting to a user.

Figure 10:
FIG. 10 illustrates an example of a graphical user interface window that displays to a user the progress made in installing a driver related to the service.

FIG. 10 illustrates an example of a graphical user interface window 1000 that indicates to a user that a driver is being installed. For example, wireless-enabled device 102 may not have had the appropriate driver installed for using the service, e.g., the print service. Based on information received from the device that provides the service, the appropriate driver may be located and installed on wireless-enabled device 102. The appropriate driver may be obtained from memory, from the device that provides the service, from a location on the internet, from another device in the proximity of wireless-enabled device 102, or from any other suitable location. In some embodiments of the invention, an advertisement may be displayed in window 1000 while the driver is being installed.

Figure 11:
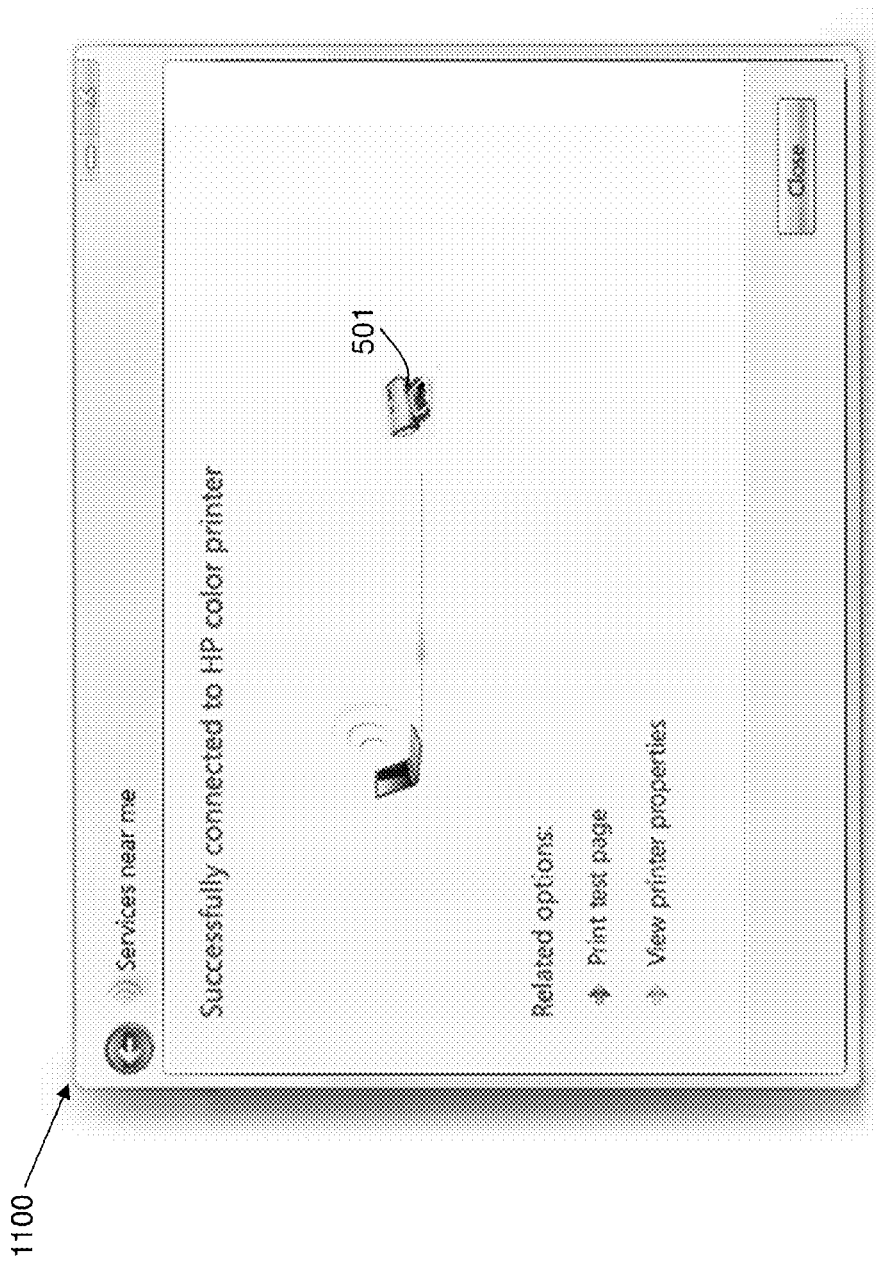
FIG. 11 illustrates an example of a graphical user interface window that indicates to a user that the connection was successful.

FIG. 11 illustrates an example of a graphical user interface window 1100 that indicates to a user that the connection has been successfully established with the device that provides the service. At this point the user may take advantage of the desired service, and the GUI may be terminated. It should be appreciated that the GUI windows illustrated in the figures are provided merely by way of illustration, and the invention is not limited to the particular layout, sequence or configuration of the GUI. Furthermore, the GUI may display one window at a time, or may display multiple windows at a time, as the invention is not limited in this respect. As used herein, the term "graphical user interface" (GUI) refers a software module that is suitable for displaying graphical content so that a user may provide input to the software module based on the graphical content. In some embodiments of the invention, the GUI provides a uniform framework for accessing services regardless of the type of services provided or the types of wireless protocol used. The GUI may run on any suitable computing platform, such as wireless-enabled device 102 or any other suitable device.

In some embodiments described above, each advertisement was transmitted in one beacon. In such embodiments, the advertisement may be limited to a size that fits within a beacon according to the protocol under which the wireless access point operates. However, the invention is not limited to advertisements of this size. Multiple beacons may be used to communicate one advertisement.

Figure 12:
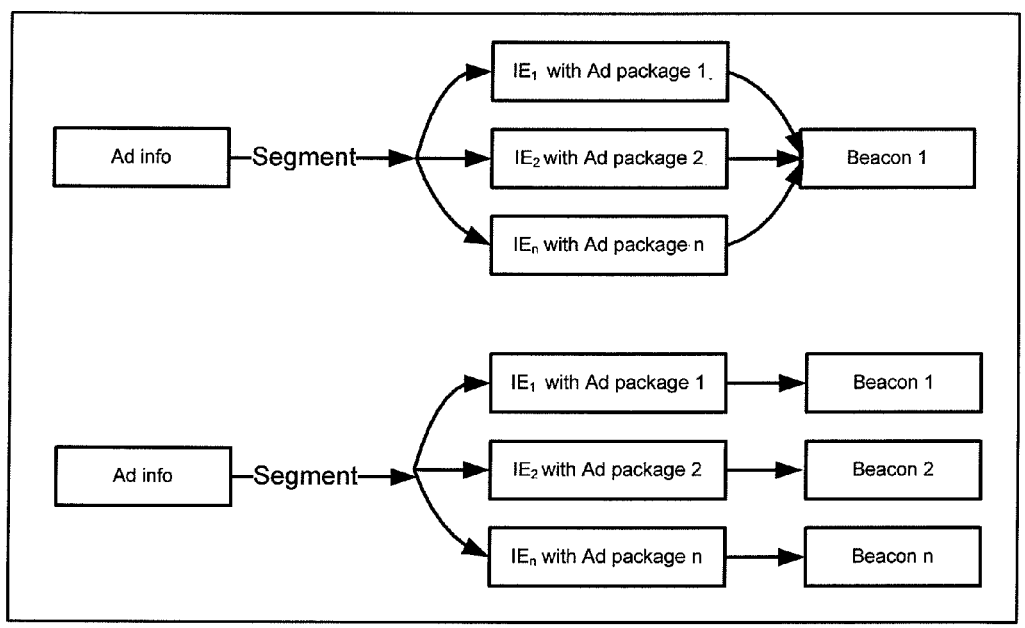
FIG. 12 illustrates an exemplary format for encoding advertisement data for transmission, in accordance with one embodiment.

As shown in FIG. 12, in accordance with some embodiments advertisement data stored by a wireless access point may be segmented into multiple information elements (IEs)

(e.g., IE$_{-1}$). Each IE may contain a portion of a single block of advertisement data which was too large to be encoded in a single IE. As indicated in FIG. 12, the data may be segmented into multiple information elements and broadcast in successive beacons or may be incorporated as separate IEs in one beacon. A client device receiving those beacons may recreate the advertisements using, for example, a counter or sequence number field.

Conversely, advertisements may be small enough that multiple advertisements may fit within defined options fields for one beacon. Each advertisement may be format as an information element, each IE containing advertisement data related to a different advertisement. These IEs may be any suitable structure for transmitting advertisement data. In some embodiments of the invention, the advertisement data, once segmented into multiple IEs, may then be combined into a single beacon comprising multiple IEs (e.g., beacon 1). The collection of IEs may then be transmitted in the single beacon from the wireless access point for receipt by client devices within range of the wireless access point.

Returning now to a discussion of the computing environment in which embodiments of the invention may be implemented, further embodiments will now be discussed in which a device does not communicate directly with another device via a wireless connection. As used herein, the terms "received by a device," and "sent by a device" mean that the messages may be received and/or sent wirelessly by the device itself or by a device that is in communication with the device. The terms "received from a device" and "sent from a device" mean that the messages may be received and/or sent wirelessly by the device itself or by a device that is in communication with the device. For example, a device 102 may send wireless request messages by communicating by wire with a WLAN access point or other device that may send a wireless request message on behalf of the device 102.

In one embodiment, a user may desire to use a service provided by a device that does not itself have wireless capabilities, e.g., speaker system 112. In one aspect of the invention, discovery of services may be provided for service(s) provided by a device that does not have wireless capabilities. For example, speaker system 112 may be in the proximity 116 of wireless-enabled device 102, but may not be equipped to communicate wirelessly with wireless-enabled device 102 without a connection to another device, e.g., access point 112. Speaker system 112 may be connected to access point 110 via another type of connection, such as a wired connection.

A discovery of services announcement may be provided for the speaker system 112 by the access point 110. For example, the exchange of messages may proceed in a similar manner as discussed in the above embodiments, however, wireless-enabled device 102 may communicate wirelessly with the speaker system 112 via access point 110 rather than directly with the speaker system 112. Access point 110 may receive messages from wireless-enabled device 102 and send the messages to the device, e.g., speaker system 112, via a different type of connection, e.g., a wired connection. Access point 110 may receive messages from the device that provides the service, e.g., speaker system 112, and send the messages wirelessly to wireless-enabled device 102. Thus, access point 110 may convert messages from one format into another format and forward messages to their destinations in the appropriate medium, e.g., wired or wireless.

In one aspect of the invention, access point 110 or another device may maintain a list of devices in the proximity of the access point 110, e.g., printers in the proximity of the access point. The devices may be connected to the access point via wired connection. If services are advertised, access point 110 may send radio messages advertising services for devices that are on the list. If a wireless-enabled device 102 actively searches for a particular service, the request message may be sent via the access point by a wired connection to an appropriate device on the list. A response message may then be sent via the wired connection and transmitted wirelessly from the access point to the requesting device.

In another aspect of the invention, wireless-enabled device 102 may access wired network 114 via access point 110. Access point 110 may exchange radio messages with wireless-enabled device 102 to enable discovery of the services that may be provided by the network 114 via the access point 110. Discovery of the wired network services may be provided using any suitable technique discussed above.

Discovery of services may also be provided for a device 102 that is not wireless-enabled. For example, a desktop computer may be connected to access point 110 via a wired connection. The desktop computer may discover services in the proximity by communicating with access point 110. By communicating with access point 110, the desktop computer may discover services provided by wireless devices such as printer 104, camera 106 and PDA 108. For example, the exchange of messages may proceed using any of the techniques discussed above, however, the wireless devices may communicate wirelessly with access point 110 rather than directly with the device that is not wireless-enabled, e.g., the desktop computer.

Particular implementation details of computer systems that may execute aspects of the invention will now be described. These implementation details are provided by way of example only, and the invention is not limited to any particular implementation.

Methods described herein, acts thereof and various embodiments and variations of these methods and acts, individually or in combination, may be defined by computer-readable messages tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Computer-readable messages embodied on one or more computer-readable media may define instructions, for example, as part of one or more programs that, as a result of being executed by a computer, instruct the computer to perform one or more of the functions described herein, and/or various embodiments, variations and combinations thereof. The computer-readable media on which such instructions are embodied may reside on one or more of the components of any of systems described herein, may be distributed across one or more of such components, and may be in transition therebetween. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. For example, various aspects of the invention may be implemented as specialized software executing in a general-purpose computer system, for example, on wireless-enabled device 102 and/or a peripheral device. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also includes one or more input devices, for example, a keyboard, mouse, trackball, microphone, touch screen, and one or more output devices, for example, a printing device, display screen, speaker. In addition, the computer system may contain one or more interfaces that connect the computer system to a communication network (in addition or as an alternative to the interconnection mechanism.

Network 114 may be any suitable type of network such a local area network (LAN), wide area network (WAN), intranet, Internet or any combination thereof. For illustrative purposes, a limited number of devices are shown in this example. The devices may be coupled to the network through one or more servers, routers, proxies, gateways, network address translation devices or any suitable combination thereof.

It should be appreciated that the invention is not limited to executing on any particular system or group of systems. Also, it should be appreciated that the invention is not limited to any particular distributed architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A client device operating in an environment comprising a plurality of wireless access points coupled to a network, the client device comprising:
    a wireless network interface adapted to determine whether at least one service is within a predetermined range of the client computing device before establishing a connection between at least one of the plurality of wireless access points and the client computing device and receive at least one announcement transmission from each of multiple wireless access points that are within the predetermined range of the client device;
    a processor connected to a memory that stores one or more driver for accessing at least one service, the processor adapted to receive from the wireless network interface segments of notification data from each received announcement transmission of the at least one announcement transmission from each of the multiple wireless access points and to combine the segments of notification data from multiple announcement transmissions to create a notification describing the at least one service offered by an entity associated with the multiple wireless access points; and
    a user interface adapted to display the notification before establishing a connection to at least one of the multiple wireless access points and to detect a request for more information on the at least one service described by the notification, wherein, in response to the request for more information, the wireless network interface is further adapted to establish a connection to at least one of the plurality of wireless access points and request information on the at least one service.

2. The client device of claim 1, wherein the at least one announcement transmission is at least one control message transmitted by one of the wireless access points comprising network characteristics enabling the client device to establish the connection.

3. The client device of claim 1, wherein the at least one announcement transmission is at least one beacon periodically transmitted by each of the multiple wireless access points.

4. The client device of claim 3, wherein the notification data is transmitted in the at least one beacon transmission as one or more information elements of the at least one beacon transmission.

5. The client device of claim 1, wherein the at least one announcement transmission is received from at least one wireless access point to which the client device is not connected.

6. The client device of claim 1, wherein the processor is further adapted to receive from the wireless network interface notification data comprising a notification for a dining service.

7. The client device of claim 1, wherein the at least one announcement transmission is at least one wireless networking beacon periodically transmitted by each of the multiple wireless access points.

8. The client device of claim 1, wherein one or more of the at least one announcement transmissions includes an information element comprising less than a complete notification.

9. The client device of claim 1, wherein one or more of the at least one announcement transmissions includes multiple information elements, and wherein each of the multiple information elements includes notification data for different notifications.

10. A method operable on a client device in an environment having a plurality of wireless access points coupled to a network, the method comprising:
   determining whether at least one service is within a predetermined range of the client computing device before establishing a connection between at least one of the plurality of wireless access points and the client computing device;
   receiving at least one announcement transmission from each of multiple wireless access points within the predetermined range of the client device;
   extracting segments of notification data from each received announcement transmission;
   combining the segments of notification data from multiple announcement transmissions to create a notification describing the at least one service offered by an entity associated with the multiple wireless access points;
   presenting the notification on the client computing device before establishing a connection to at least one of the plurality of wireless access points;
   detecting a request for more information regarding the at least one service described by the notification;
   in response to detecting the request, establishing a connection to at least one of the plurality of wireless access points; and
   requesting information regarding the at least one service over the established connection.

11. The method of claim 10, wherein the at least one announcement transmission is at least one beacon periodically transmitted by each of the multiple wireless access points.

12. The method of claim 11, wherein the notification data is transmitted in the at least one beacon transmission as one or more information elements of the at least one beacon transmission, and wherein the at least one announcement transmission is received from at least one wireless access point to which the client device is not connected.

13. The method of claim 10, wherein the announcement transmissions are beacons for a 802.11 wireless local area network.

14. The method of claim 10, wherein one or more of the at least one announcement transmissions includes an information element comprising less than a complete_notification.

15. The method of claim 10, wherein one or more of the at least one announcement transmissions includes multiple information elements, and wherein each of the multiple information elements includes notification data for different notifications.

16. A computer-readable storage medium having instructions stored therein for performing operations on a client device in an environment having a plurality of wireless access points coupled to a network, the operations comprising:
   determining whether at least one service is within a predetermined range of the client computing device before establishing a connection between at least one of the plurality of wireless access points and the client computing device;
   receiving at least one announcement transmission from each of multiple wireless access points within the predetermined range of the client device;
   extracting segments of notification data from each received announcement transmission;
   combing the segments of notification data from multiple announcement transmissions into a notification;
   creating a notification describing the at least one service offered by an entity associated with the multiple wireless access points;
   presenting the notification on a user interface of the client computing device before establishing a connection to at least one of the plurality of wireless access points;
   detecting a request for more information regarding the at least one service described by the notification;
   in response to detecting the request, establishing a connection to at least one of the plurality of wireless access points; and
   requesting information regarding the at least one service over the established connection.

17. The computer-readable storage medium of claim 16, wherein the at least one announcement transmission is at least one beacon periodically transmitted by each of the multiple wireless access points.

18. The computer-readable storage medium of claim 16, wherein the at least one announcement transmission is received from at least one wireless access point to which the client device is not connected.

19. The computer-readable storage medium of claim 16, wherein one or more of the at least one announcement transmissions includes an information element comprising notification data for multiple notifications.

20. The computer-readable storage medium of claim 16, wherein one or more of the at least one announcement transmissions includes multiple information elements, and wherein each of the multiple information elements includes notification data for different notifications.

* * * * *